US011232286B2

United States Patent
Rao et al.

(10) Patent No.: US 11,232,286 B2
(45) Date of Patent: Jan. 25, 2022

(54) METHOD AND APPARATUS FOR GENERATING FACE ROTATION IMAGE

(71) Applicants: Huawei Technologies Co., Ltd., Shenzhen (CN); Institute of Automation, Chinese Academy of Sciences, Beijing (CN)

(72) Inventors: Qiang Rao, Shenzhen (CN); Bing Yu, Hangzhou (CN); Bailan Feng, Beijing (CN); Yibo Hu, Beijing (CN); Xiang Wu, Beijing (CN); Ran He, Beijing (CN); Zhenan Sun, Beijing (CN)

(73) Assignees: Huawei Technologies Co., Ltd., Shenzhen (CN); Institute of Automation, Chinese Academy of Sciences, Beijing (CN)

( * ) Notice: Subject to any disclaimer, the term of this patent is extended or adjusted under 35 U.S.C. 154(b) by 0 days.

(21) Appl. No.: 17/038,208

(22) Filed: Sep. 30, 2020

(65) Prior Publication Data
US 2021/0012093 A1    Jan. 14, 2021

Related U.S. Application Data

(63) Continuation of application No. PCT/CN2018/089611, filed on Jun. 1, 2018.

(51) Int. Cl.
*G06K 9/00* (2006.01)
*G06K 9/62* (2006.01)
(Continued)

(52) U.S. Cl.
CPC ..... *G06K 9/00281* (2013.01); *G06K 9/00248* (2013.01); *G06K 9/00288* (2013.01);
(Continued)

(58) Field of Classification Search
CPC ........... G06K 9/00281; G06K 9/00248; G06K 9/00288; G06K 9/6256; G06K 9/6271;
(Continued)

(56) References Cited

U.S. PATENT DOCUMENTS

| 8,090,160 B2 * | 1/2012 | Kakadiaris | ......... G06K 9/00268 |
| | | | 382/118 |
| 10,878,612 B2 * | 12/2020 | Wang | ...................... G06T 15/04 |
| 2018/0268202 A1 * | 9/2018 | Yu | ............................ G06F 16/71 |

FOREIGN PATENT DOCUMENTS

| CN | 103065360 A | 4/2013 |
| CN | 105740758 A | 7/2016 |

(Continued)

OTHER PUBLICATIONS

"How to rotate the face in the image?," CVPR 2018—Zhihu, retrieved from the internet:https://zhuanlan.zhihu.com/p/37305160, pp. 1-6, AI Technology Review (May 25, 2018).
(Continued)

*Primary Examiner* — Phuoc Tran
(74) *Attorney, Agent, or Firm* — Leydig, Voit & Mayer, Ltd.

(57) ABSTRACT

A method and an apparatus for generating a face rotation image are provided. The method includes: performing pose encoding on an obtained face image based on two or more landmarks in the face image, to obtain pose encoded images; obtaining a plurality of training images each including a face from a training data set, wherein presented rotation angles of the faces included in the plurality of training images are the same; performing pose encoding on a target face image based on two or more landmarks in the target face image in the foregoing similar manner, to obtain pose encoded images, wherein the target face image is obtained based on the plurality of training images; generating a to-be-input signal based on the face image and the foregoing two types
(Continued)

of pose encoded images; and inputting the to-be-input signal into an face rotation image generative model to obtain a face rotation image.

20 Claims, 8 Drawing Sheets

(51) Int. Cl.
  *G06T 5/00* (2006.01)
  *G06T 9/00* (2006.01)
(52) U.S. Cl.
  CPC ............ *G06K 9/6256* (2013.01); *G06T 5/002* (2013.01); *G06T 9/00* (2013.01); *G06T 2207/20081* (2013.01); *G06T 2207/20084* (2013.01); *G06T 2207/30201* (2013.01)
(58) Field of Classification Search
  CPC . G06T 5/002; G06T 9/00; G06T 2207/20081; G06T 2207/20084; G06T 2207/30201; G06T 9/002; G06T 3/0093
  See application file for complete search history.

(56) References Cited

FOREIGN PATENT DOCUMENTS

| CN | 106251294 A | 12/2016 |
|---|---|---|
| CN | 107437077 A | 12/2017 |
| CN | 107506717 A | 12/2017 |
| CN | 107871107 A | 4/2018 |

OTHER PUBLICATIONS

Feng "The Institute of Automation, Chinese Academy of Sciences: Theory, Method and Application of Large-scale Face Image Editing," pp. 1-12, Baidu (May 4, 2018).

Zhu et al., "High-Fidelity Pose and Expression Normalization for Face Recognition in the Wild," 2015 IEEE Conference on Computer Vision and Pattern Recognition (CVPR), pp. 787-796, Institute of Electrical and Electronics Engineers, New York, New York (Jun. 2015).

Cole et al., "Synthesizing Normalized Faces from Facial Identity Features," 2017 IEEE Conference on Computer Vision and Pattern Recognition (CVPR), pp. 3703-3712, Institute of Electrical and Electronics Engineers, New York, New York (Jul. 2017).

Tran et al., "Disentangled Representation Learning GAN for Pose-Invariant Face Recognition," 2017 IEEE Conference on Computer Vision and Pattern Recognition (CVPR), pp. 1283-1292, Institute of Electrical and Electronics Engineers, New York, New York (Jul. 2017).

Yin et al., "Towards Large-Pose Face Frontalization in the Wild," 2017 IEEE International Conference on Computer Vision (ICCV), pp. 3990-3999, Institute of Electrical and Electronics Engineers, New York, New York (Oct. 2017).

Hassner et al., "Effective Face Frontalization in Unconstrained Images," 2015 IEEE Conference on Computer Vision and Pattern Recognition (CVPR), pp. 4295-4304, Institute of Electrical and Electronics Engineers, New York, New York (Jun. 2015).

Sagonas et al., "Robust Statistical Face Frontalization," 2015 IEEE International Conference on Computer Vision (ICCV), pp. 3871-3879, Institute of Electrical and Electronics Engineers, New York, New York (Dec. 2015).

\* cited by examiner

METHOD AND APPARATUS FOR GENERATING FACE ROTATION IMAGE

CROSS-REFERENCE TO RELATED APPLICATIONS

This application is a continuation of International Application No. PCT/CN2018/089611, filed on Jun. 1, 2018, the disclosure of which is hereby incorporated by reference in its entirety.

STATEMENT OF JOINT RESEARCH AGREEMENT

The subject matter and the claimed invention were made by or on the behalf of Institute of Automation, Chinese Academy of Sciences, of Haidian District, Beijing, P.R. China and Huawei Technologies Co., Ltd., of Shenzhen, Guangdong Province, P.R. China, under a joint research agreement titled "Method and Apparatus for Generating Face Rotation Image." The joint research agreement was in effect on or before the claimed invention was made, and that the claimed invention was made as a result of activities undertaken within the scope of the joint research agreement.

TECHNICAL FIELD

Embodiments of the present invention relate to the field of computer vision, and in particular, to a method and an apparatus for generating a face rotation image.

BACKGROUND

Computer vision is an integral part of various intelligent/autonomic systems in various application fields, for example, fields such as a manufacturing industry, inspection, document analysis, medical diagnosis, and military affairs. The computer vision is knowledge about how to use a camera/video camera and a computer to obtain required data and information of a photographed subject. To be vivid, eyes (the camera/video camera) are mounted and a brain (an algorithm) is installed on the computer to replace human eyes to identify, track, and measure a target, and the like, so that the computer can perceive an environment. The perceiving may be considered as extracting information from a perceptual signal. Therefore, the computer vision may also be considered as a science of studying how to make an artificial system perform "perceiving" from an image or multi-dimensional data. In conclusion, the computer vision is to replace a visual organ with various imaging systems to obtain input information, and then replace a brain with a computer to process and interpret the input information. A final study objective of the computer vision is to make a computer observe and understand the world through vision in a way that human beings do, and have a capability of automatically adapting to an environment.

Face rotation means that for a given 2D face image, an authentic face image that is obtained after the face is rotated and that complies with a geometric mapping principle of the face in three-dimensional space is obtained by using a computer vision-related method, such as image processing, machine learning, or computer graphics. The face rotation is mainly to resolve a problem that profile face recognition is inaccurate due to large-angle rotation of a face. In addition, the face rotation may further resolve a problem of insufficient face data during facial recognition model training, to be specific, may be used to expand the face data.

There are many methods for resolving the profile face recognition problem, and a face rotation technology is one of them. For the face rotation technology, common methods are: a 3D/2D model and generation of sparse subspace. In the 3D/2D model, a 3D model parameter of a face is estimated by mapping a 2D face image to a 3D face model, and then a projected image of the rotated face is obtained by changing a visual angle, so that a rotated 2D face image is obtained. A problem of face image rotation in any pose can be theoretically resolved by using the 3D face model. However, at present, 3D face calculation amount is large, and authenticity precision is not high. The sparse subspace generation method is solving a frontal face image with a lowest rank by using a low-rank constraint after different poses of a same face are considered as linear subspace by using a sparse and low-rank learning method. This method is mainly used to resolve a technical problem of rotating a face from a profile face to a frontal face. The rotation from a profile face to a frontal face is a special case of face rotation.

To resolve the foregoing problem, in the prior art, pose encoding of a face image is guided by using a generative adversarial network and a one-dimensional one-hot pose encoder, to generate different pose features of the face image. The generative adversarial network is a method for training a face generative model by using a deep learning model in a generative adversarial manner. However, in the prior art, a pose is inaccurately represented in a one-hot pose encoding manner, and the manner does not have continuity. In addition, in an existing solution, a structure of an adversarial discriminator network in a generative adversarial network makes adversarial discrimination insufficiently robust. Consequently, an effect of a rotation image generated by using the generative adversarial network is poor.

SUMMARY

Embodiments of this application disclose a method and an apparatus for generating a face rotation image, to improve face rotation image generation efficiency and obtain better image quality.

According to a first aspect, an embodiment of this application provides a method for generating a face rotation image, including:

receiving a face image;

performing pose encoding on the face image based on two or more landmarks in the face image, to obtain pose encoded images of the face image;

obtaining a plurality of first training images from a training data set based on a face rotation angle, where each of the plurality of first training images includes a face, and a presented rotation angle of the face included in each of the plurality of first training images is the face rotation angle;

performing pose encoding on a target face image based on two or more landmarks in the target face image, to obtain pose encoded images of the target face image, where the target face image is obtained based on the plurality of first training images;

generating a to-be-input signal based on the face image, the pose encoded images of the face image, and the pose encoded images of the target face image, where a size of the face image, a size of the pose encoded images of the face image, and a size of the pose encoded images of the target face image are the same; and inputting the to-be-input signal into a face rotation image generative model, to obtain a face rotation image.

According to the method for generating a face rotation image provided in this embodiment of this application, the pose encoding is performed on the face image and the target face image, so that the input signal of the face rotation image generative model is obtained, and the face rotation image is further generated by using the face rotation image generative model. Because a face pose is described more accurately and robustly in the pose encoding manner, the generated face rotation image is more accurate. In addition, because the target face image provided in the method is obtained based on the plurality of first training images, the presented rotation angles of the faces included in the plurality of first training image are the same, and the rotation angle herein may be preset by a user. For example, the user enters a face image, and instructs an image generation device to generate a face rotation image at a preset angle, so that the presented rotation angles of the faces included in the foregoing plurality of first training images are all the preset angle. According to the setting, the method for generating a face rotation image provided in this embodiment of this application imposes no limitation on the face rotation angle, to be specific, face rotation at various angles can be implemented.

It should be noted that, in the method according to the first aspect, the plurality of first training images are obtained from the training data set based on the face rotation angle, each of the plurality of first training images includes the face, and the face herein and a face in the face image do not need to be the same. Actually, in the method according to the first aspect, the face image may be a real-time to-be-rotated face entered by the user, while the plurality of first training images are a training data set maintained by a database, so that it may be considered that the faces included in the plurality of first training images do not have a direct relationship with the face included in the face image. Certainly, the face included in the face image may also appear in the database and be used as training data.

It should be noted that in the method according to the first aspect, the generating a to-be-input signal based on the face image, the pose encoded images of the face image, and the pose encoded images of the target face image may be specifically obtaining the to-be-input signal by fusing the face image, the pose encoded images of the face image, and the pose encoded images of the target face image in a feature fusion manner. The feature fusion is organically combining discriminative and complementary features together as a unified feature in a particular manner. The feature fusion is a common technical means in the field of biometric recognition technologies, and the feature fusion may be implemented in a plurality of manners. Information included in the fused feature is more accurate and richer. It may be understood that, compared with information included in any image or pose encoded image of the face image, the pose encoded images of the face image, and the pose encoded images of the target face image, information included in the to-be-input signal is more accurate and richer. Therefore, the face rotation image is generated by using the to-be-input signal, so that the generated face rotation image is more accurate. When the face rotation method is applied to a facial recognition application scenario, a more accurate face rotation image can be used to improve facial recognition accuracy.

In a possible implementation, the performing pose encoding on the face image based on two or more landmarks in the face image, to obtain pose encoded images of the face image includes:

detecting the face image by using a landmark detection algorithm, to obtain location coordinates respectively corresponding to N landmarks of the face image, where N is an integer greater than 1;

constructing N first images having a same size as the face image, where the N first images are in a one-to-one correspondence with the N landmarks; and performing, by using each of the N landmarks as a center, Gaussian blurring on the first image that is in the one-to-one correspondence with the landmark, to obtain N first Gaussian blurred images, where the N first Gaussian blurred images are the pose encoded images of the face image.

In this possible implementation, the N landmarks of the face image are first determined, and then Gaussian blurring is performed, by using each landmark as a center, on the first image corresponding to the landmark. In the manner in which the image pose encoding is implemented by performing Gaussian blurring by using the landmark, descriptions of a face pose are more accurate and robust, so that a higher-quality face rotation image is obtained.

In a possible implementation, the constructing N first images having a same size as the face image includes:

generating N all-zero matrices, where each all-zero matrix corresponds to one landmark; and mapping a location of the landmark in the face image to a corresponding location in the all-zero matrix, and changing a value of the corresponding location in the all-zero matrix from 0 to 1, to generate N one-hot code matrices, where the N one-hot code matrices are the N first images.

It should be noted that the N first images are related to the location coordinates of the landmarks in the face image.

In a possible implementation, the performing, by using each of the N landmarks as a center, Gaussian blurring on the first image that is in the one-to-one correspondence with the landmark includes:

performing Gaussian blurring on each one-hot code matrix by using a point whose value is 1 in the one-hot code matrix as a center.

In a possible implementation, the performing pose encoding on a target face image based on two or more landmarks in the target face image, to obtain pose encoded images of the target face image includes:

detecting the target face image by using the landmark detection algorithm, to obtain location coordinates respectively corresponding to M landmarks of the target face image, where M is an integer greater than 1;

constructing M second images having a same size as the target face image, where the M second images are in a one-to-one correspondence with the M landmarks; and performing, by using each of the M landmarks as a center, Gaussian blurring on the second image that is in the one-to-one correspondence with the landmark, to obtain M second Gaussian blurred images, where the M second Gaussian blurred images are the pose encoded images of the target face image.

It should be noted that a manner of constructing the M second images having the same size as the target face image is the same as a manner of constructing the N first image having the same size as the face image in the foregoing possible implementation, and details are not described herein again.

In a possible implementation, that the target face image is obtained based on the plurality of first training images includes:

the target face image is obtained based on an average value of pose encoded images of the plurality of first training images.

It should be noted that, the pose encoded images of the plurality of first training images herein may also be obtained in the foregoing pose encoding manner, and details are not described herein again.

In a possible implementation, the face rotation image generative model is obtained based on training of a generative adversarial network; the generative adversarial network includes at least one face generator network and at least two discriminator networks; the at least two discriminator networks are coupled and adversarial, to generate an adversarial loss; the adversarial loss is used to update the at least one face generator network and the at least two discriminator networks; and the at least one updated face generator network is the face rotation image generative model.

At least two discriminator networks that form a coupled and adversarial relationship are used, so that different discriminator networks can discriminate, by using different conditions, a predicted face rotation image generated by the face generator network, and discrimination results obtained by the different discriminator networks affect the generative adversarial network. In this way, the generative adversarial network can adjust and control different aspects of the face image based on the foregoing different conditions, so that a more accurate face rotation image is output.

According to a second aspect, an embodiment of this application provides a method for training a generative adversarial network, the generative adversarial network includes a face generator network and a plurality of coupled adversarial discriminator networks, the coupled adversarial discriminator networks include at least a first discriminator network and a second discriminator network, and the method includes:

receiving a face image and a face rotation image, where the face image and the face rotation image are images before and after a same face is rotated;

performing pose encoding on the face image based on two or more landmarks in the face image, to obtain pose encoded images of the face image;

performing pose encoding on the face rotation image based on two or more landmarks in the face rotation image, to obtain pose encoded images of the face rotation image;

inputting the face image, the pose encoded images of the face image, and the pose encoded images of the face rotation image into the face generator network, to generate a predicted face rotation image;

inputting the face image, the face rotation image, and the predicted face rotation image into the first discriminator network, to obtain a first loss;

inputting the face rotation image, the pose encoded images of the face rotation image, and the predicted face rotation image into the second discriminator network, to obtain a second loss;

updating the face generator network, the first discriminator network, and the second discriminator network based on a total loss of the generative adversarial network, where the total loss of the generative adversarial network is obtained based on a weighted sum of the first loss and the second loss; and outputting the trained face generator network after the total loss of the generative adversarial network is converged.

It should be noted that face image and the face rotation image are images before and after the same face is rotated, and it is not limited herein that the rotation should be rotation from a frontal face to a profile face, or rotation from a profile face to a frontal face. It should be understood that, there is a rotation angle of a particular size between the face before the rotation and the face after the rotation. The rotation angle may be preset, and details are not described herein again.

According to the method for training a generative adversarial network provided in this embodiment of this application, the pose encoding is performed on the face image and the face rotation image to obtain the pose encoded images of the face image and the pose encoded images of the face rotation image, and the predicted face rotation image is generated by the face generator network in the generative adversarial network. Further, the predicted face rotation image is separately discriminated by using at least the first discriminator network and the second discriminator network, to obtain the first loss and the second loss, a weighted summation is performed on the first loss and the second loss to obtain the total loss of the generative adversarial network, and the face generator network, the first discriminator network, and the second discriminator network in the generative adversarial network are updated by using the total loss. In the foregoing pose encoding manner, descriptions of a face pose are more accurate and robust, so that the predicted face rotation image obtained by the face generator network or the discriminator network by using the foregoing pose encoded images is also closer to an authentic face rotation image. In addition, in the training method, a rotation angle of training data (the face image and the face rotation image) is not limited. Therefore, the network obtained through the training may also be applicable to face rotation at various different angles, thereby improving operability of face rotation and user experience. In addition, the first discriminator network and the second discriminator network are used, and the first discriminator network and the second discriminator network are coupled and adversarial, so that different discriminator networks can discriminate, by using different conditions, the predicted face rotation image generated by the face generator network, and discrimination results obtained by the different discriminator networks affect the generative adversarial network. In this way, the generative adversarial network can adjust and control different aspects of the face image based on the foregoing different conditions, so that a more accurate face rotation image is output.

In a possible implementation, before the updating the face generator network, the first discriminator network, and the second discriminator network based on a total loss of the generative adversarial network, the method further includes:

obtaining an authentic image loss based on the face rotation image and the predicted face rotation image, where the authentic image loss includes at least one of a pixel loss, a total variation regularization, and an identity recognition feature loss; and correspondingly, the total loss of the generative adversarial network is obtained based on a weighted sum of the at least one loss in the authentic image loss, the first loss, and the second loss.

In the possible implementation of this embodiment of this application, not only the first loss and the second loss are considered, but also the authentic image loss, such as the pixel loss, the total variation regularization, or the identity recognition feature loss, is considered. When the authentic image loss includes the pixel loss, the total loss of the generative adversarial network is obtained based on a weighted sum of the first loss, the second loss, and the pixel loss. The pixel loss is introduced, so that on a basis of enriching a training condition of the generative adversarial network, stability of the training is further considered and the convergence of the training of the generative adversarial network can be accelerated. When the authentic image loss includes the total variation regularization, the total loss of the generative adversarial network is obtained based on a weighted sum of the first loss, the second loss, and the total variation regularization. The total variation regularization has a function of avoiding an excessively large local gradient of the generated image. Therefore, introduction of the total variation regularization avoids, on a basis of enriching a training condition of the generative adversarial network, a local defect of the generated predicted face image caused by an excessively large local gradient. When the authentic image loss includes the identity recognition feature loss, the total loss of the generative adversarial network is obtained based on a weighted sum of the first loss, the second loss, and the identity recognition feature loss. The identity recognition feature is used to ensure that identity information remains unchanged for the face included in the generated predicted face rotation image and the face included in the input training data (the face image and the face rotation image). The identity recognition feature loss is introduced, so that the generative adversarial network obtained through the training can generate a rotated image with more accurate identity information. When the authentic image loss includes two or three of the foregoing three losses, corresponding effects are considered.

In a possible implementation, the performing pose encoding on the face image based on two or more landmarks in the face image, to obtain pose encoded images of the face image includes:

detecting the face image by using a landmark detection algorithm, to obtain location coordinates respectively corresponding to N landmarks of the face image; constructing N first images having a same size as the face image, where the N first images are in a one-to-one correspondence with the N landmarks; and performing, by using each of the N landmarks as a center, Gaussian blurring on the first image that is in the one-to-one correspondence with the landmark, to obtain N first Gaussian blurred images, where the N first Gaussian blurred images are the pose encoded images of the face image, and N is a positive integer greater than 1.

In a possible implementation, the constructing N first images having a same size as the face image includes:

generating N all-zero matrices, where each all-zero matrix corresponds to one landmark; and mapping a location of the landmark in the face image to a corresponding location in the all-zero matrix, and changing a value of the corresponding location in the all-zero matrix from 0 to 1, to generate N one-hot code matrices, where the N one-hot code matrices are the N first images.

In a manner in which the image pose encoding is implemented by performing Gaussian blurring by using the landmark, descriptions of the face pose are more accurate and robust. The more accurate and robust face pose descriptions can make the predicted face rotation image generated by the face generator network be closer to the authentic face rotation image.

It should be noted that the N first images are related to the location coordinates of the landmarks in the face image.

In a possible implementation, the performing, by using each of the N landmarks as a center, Gaussian blurring on the first image that is in the one-to-one correspondence with the landmark includes:

performing Gaussian blurring on each one-hot code matrix by using a point whose value is 1 in the one-hot code matrix as a center.

In a possible implementation, the performing pose encoding on the face rotation image based on two or more landmarks in the face rotation image, to obtain pose encoded images of the face rotation image includes:

detecting the face rotation image by using the landmark detection algorithm, to obtain location coordinates respectively corresponding to M landmarks of the face rotation image; constructing M second images having a same size as the face rotation image, where the M second images are in a one-to-one correspondence with the M landmarks; and performing, by using each of the M landmarks as a center, Gaussian blurring on the second image that is in the one-to-one correspondence with the landmark, to obtain M second Gaussian blurred images, where the M second Gaussian blurred images are the pose encoded images of the face rotation image, and M is a positive integer greater than 1.

It should be noted that a manner of constructing the M second images having the same size as the face rotation image is the same as a manner of constructing the N first image having the same size as the face image in the foregoing possible implementation, and details are not described herein again.

In a possible implementation, the inputting the face image, the face rotation image, and the predicted face rotation image into the first discriminator network, to obtain a first loss includes:

determining truth or falsehood of the face rotation image and the predicted face rotation image based on the first discriminator network by using the face image as a discrimination condition of the first discriminator network; and generating the first loss based on a discrimination result, where the first discriminator network includes a binary classification discriminator, and the binary classification discriminator is configured to determine the truth or falsehood.

In a possible implementation, the determining truth or falsehood of the face rotation image and the predicted face rotation image based on the first discriminator network by using the face image as a discrimination condition of the first discriminator network; and generating the first loss based on a discrimination result includes:

$$L^{ii} = E_{I^b \sim H(I^b)}[\log D_{\theta_{ii}}(I^b, I^a)] + E_{\hat{I}^b \sim H(\hat{I}^b)}[1 - D_{\theta_{ii}}(\hat{I}^b, I^a)],$$
where $L^{ii}$ is the first loss; $I^a$ is the face image; $I^b$ is the face rotation image; $\hat{I}^b$ is the predicted face rotation image; $E_{I^b \sim H(I^b)}$ represents an expectation of distribution $H(I^b)$ of the face rotation image $I^b$, namely, a probability that the face rotation image $I^b$ is true; $\log D_{\theta_{ii}}(I^b, I^a)$ represents a loss function of the first discriminator network; $E_{\hat{I}^b \sim H(\hat{I}^b)}$ represents an expectation of distribution $H(\hat{I}^b)$ of the predicted face rotation image $\hat{I}^b$, namely, a probability that the predicted face rotation image $\hat{I}^b$ is true; $D_{\theta_{ii}}(\hat{I}^b, I^a)$ is the first discriminator network using the face image as a condition; $\theta_{ii}$ is a parameter of the first discriminator network; and $(\hat{I}^b, I^a)$ is an input of the first discriminator network.

In a possible implementation, the inputting the face rotation image, the pose encoded images of the face rotation image, and the predicted face rotation image into the second discriminator network, to obtain a second loss includes:

determining truth or falsehood of the face rotation image and the predicted face rotation image based on the second discriminator network by using the pose encoded images of the face rotation image as a discrimination condition of the second discriminator network; and generating the second loss based on a discrimination result, where the second discriminator network includes a binary classification discriminator, and the binary classification discriminator is configured to determine the truth or falsehood.

In the foregoing generative adversarial network, the first discriminator network uses the face image as the discrimination condition, the second discriminator network uses the pose encoded images of the face rotation image as the discrimination condition, and the discrimination results finally obtained by the first discriminator network and the second discriminator network are the first loss and the second loss. The weighted sum of the first loss and the second loss is used as the total loss of the generative adversarial network, and the total loss is used to update the generative adversarial network (including the face generator network, the first discriminator network, and the second discriminator network). Therefore, the generative adversarial network obtained through the training can very well grasp information of both face apparent authenticity and the face pose. In conclusion, because the first discriminator network uses the face image as the discrimination condition, it may be understood that the face apparent authenticity is controlled by the first discriminator network. Because the second discriminator network uses the pose encoded images of the face rotation image as the discrimination condition, it may be understood that the face pose is controlled by the second discriminator network.

In a possible implementation, the determining truth or falsehood of the face rotation image and the predicted face rotation image based on the second discriminator network by using the pose encoded images of the face rotation image as a discrimination condition of the second discriminator network; and generating the second loss based on a discrimination result includes:

$$L^{ip} = E_{I^b \sim H(I^b)}[\log D_{\theta_{ip}}(I^b, P^b)] + E_{\hat{I}^b \sim H(\hat{I}^b)}[1 - D_{\theta_{ip}}(\hat{I}^b, P^b)],$$

where $L^{ip}$ is the second loss; $I^b$ is the face rotation image; $\hat{I}^b$ is the predicted face rotation image; $P^b$ is the pose encoded images of the face rotation image; $E_{I^b \sim H(I^b)}$ represents an expectation of distribution $H(I^b)$ of the face rotation image $I^b$, namely, a probability that the face rotation image $I^b$ is true; [log $D_{\theta_{ip}}(I^b, P^b)$] represents a loss function of the second discriminator network; $E_{\hat{I}^b \sim H(\hat{I}^b)}$ represents an expectation of distribution $H(\hat{I}^b)$ of the predicted face rotation image $\hat{I}^b$, namely, a probability that the predicted face rotation image $\hat{I}^b$ is true; $D_{\theta_{ip}}(\hat{I}^b, P^b)$ is the second discriminator network using the pose encoded images of the face rotation image as a condition; $\theta_{ip}$ is a parameter of the second discriminator network; and $(\hat{I}^b, P^b)$ is an input of the second discriminator network.

In a possible implementation, when the authentic image loss includes the pixel loss, the obtaining an authentic image loss based on the face rotation image and the predicted face rotation image includes:

$$L_{pix} = \frac{1}{S} \sum_{s=1}^{S} \left\| \hat{I}^b - I^b \right\|_1^s,$$

where $L_{pix}$ is the pixel loss, S is a scale metric, $\hat{I}^b$ is the predicted face rotation image, $I^b$ is the face rotation image, and $\|\hat{I}^b - I^b\|_1^s$ represents that a 1-norm loss of a pixel difference is calculated when the predicted face rotation image and the face rotation image are scaled to the S scale metric.

It should be noted that the pixel difference herein indicates a difference between pixels at corresponding locations of the predicted face rotation image and the face rotation image.

In a possible implementation, when the authentic image loss includes the total variation regularization, the obtaining an authentic image loss based on the face rotation image and the predicted face rotation image includes:

$$L_{tv} = \sum_{c=1}^{C} \sum_{w,h=1}^{W,H} \left| \hat{I}^b_{w+1,h,c} - \hat{I}^b_{w,h,c} \right| + \left| \hat{I}^b_{w+1,h,c} - \hat{I}^b_{w,h,c} \right|,$$

where $L_{tv}$ is the total variation regularization, to be specific, a sum of first-order gradient absolute values of the predicted face rotation image $\hat{I}^b$ in both horizontal and vertical directions, where W represents a width of the predicted face rotation image, H represents a height of the predicted face rotation image, and C represents a quantity of channels of the predicted face rotation image.

In a possible implementation, when the authentic image loss includes the identity recognition feature loss, the obtaining an authentic image loss based on the face rotation image and the predicted face rotation image includes:

$$L_{ip} = \|D_f^p(\hat{I}^b) - D_f^p(I^b)\|_2 + \|D_f^{fc}(\hat{I}^b) - D_f^{fc}(I^b)\|, \text{ where}$$

an identity recognition feature is used to ensure that identity information remains unchanged for the predicted face rotation image and the face image; $L_{ip}$ indicates the identity recognition feature loss; and f is a pre-trained facial recognition model, the facial recognition model f is a deep neural network, and the deep neural network includes at least one pooling layer and at least one fully connected layer, where $D_f^p(\cdot)$ represents an output of the last pooling layer of the facial recognition model f, and $D_f^{fc}(\cdot)$ represents an output of the last fully connected layer of the facial recognition model f.

In a possible implementation, the updating the face generator network, the first discriminator network, and the second discriminator network based on a total loss of the generative adversarial network includes:

updating the face generator network, so that an error generated by the face generator network is the minimum;

updating the first discriminator network and the second discriminator network, so that values of the first loss and the second loss are the maximum; and alternately iterating the updates until the generative adversarial network is converged.

According to a third aspect, an embodiment of this application provides a method for generating a human body rotation image, including:

receiving a human body image;

performing pose encoding on the human body image, to obtain pose encoded images of the human body image;

obtaining a plurality of second training images from a training data set based on a human body rotation angle, where each of the plurality of second training images include a human body, and presented rotation angles of the human body included in the plurality of second training images are all the human body rotation angle;

performing pose encoding on a target human body image, to obtain pose encoded images of the target human body image, where the target human body image is obtained based on the plurality of second training images;

generating a to-be-input signal based on the human body image, the pose encoded images of the human body image, and the pose encoded images of the target human body image, where a size of the human body image, a size of the pose encoded images of the human body image, and a size of the pose encoded images of the target human body image are the same; and inputting the to-be-input signal to a human body rotation image generative model, to obtain a human body rotation image.

It should be noted that in the method according to the third aspect, the generating a to-be-input signal based on the human body image, the pose encoded images of the human body image, and the pose encoded images of the target human body image may be specifically obtaining the to-be-input signal by fusing the human body image, the pose encoded images of the human body image, and the pose encoded images of the target human body image in a feature fusion manner. The feature fusion is organically combining discriminative and complementary features together as a unified feature in a particular manner. The feature fusion is a common technical means in the field of biometric recognition technologies, and the feature fusion may be implemented in a plurality of manners. Information included in the fused feature is more accurate and richer. Compared with information included in any image or pose encoded image of the human body image, the pose encoded images of the human body image, or the pose encoded images of the target human body image, information included in the to-be-input signal is more accurate and richer. Therefore, the human body rotation image is generated by using the to-be-input signal, so that the generated human body rotation image is more accurate. When the human body rotation method is applied to a person positioning or recognition application scenario of a monitoring system, a more accurate human body rotation image can be used to improve positioning and recognition accuracy.

In a possible implementation, the performing pose encoding on the human body image, to obtain pose encoded images of the human body image includes:

detecting the human body image by using a landmark detection algorithm, to obtain location coordinates respectively corresponding to W landmarks of the human body image, where W is an integer greater than 1;

constructing W third images having a same size as the human body image, where the W third images are in a one-to-one correspondence with the W landmarks; and performing, by using each of the W landmarks as a center, Gaussian blurring on the third image that is in the one-to-one correspondence with the landmark, to obtain W third Gaussian blurred images, where the W third Gaussian blurred images are the pose encoded images of the human body image.

In this possible implementation, the W landmarks of the human body image are first determined. When the human body image and the face image in the first aspect include a same person, the W landmarks herein may include the N landmarks in the first aspect, and the N landmarks are only landmarks on the face, for example, a left eyeball center, a right eyeball center, a nose tip, a left mouth corner, and a right mouth corner; or may include points of a facial contour, or the like. The W landmarks may further include points corresponding to key parts of a human body, for example, a left elbow point, a right elbow point, a center point of a left knee, and a center point of a right knee.

After the W landmarks are determined, Gaussian blurring is performed, by using each landmark as a center, on the third image corresponding to the landmark. In the manner in which the image pose encoding is implemented by performing Gaussian blurring by using the landmark, descriptions of a human body pose are more accurate and robust, so that a higher-quality human body rotation image is obtained.

In a possible implementation, the constructing W third images having a same size as the human body image includes:

generating W all-zero matrices, where each all-zero matrix corresponds to one landmark; and mapping a location of the landmark in the human body image to a corresponding location in the all-zero matrix, and changing a value of the corresponding location in the all-zero matrix from 0 to 1, to generate W one-hot code matrices, where the W one-hot code matrices are the W third images.

It should be noted that the W third images are related to the location coordinates of the landmarks in the human body image.

In a possible implementation, the performing, by using each of the W landmarks as a center, Gaussian blurring on the third image that is in the one-to-one correspondence with the landmark includes:

performing Gaussian blurring on each one-hot code matrix by using a point whose value is 1 in the one-hot code matrix as a center.

A pose encoding manner of the target human body image and the foregoing pose encoding manner of the human body image are the same, and may be different in terms of a quantity of landmarks. However, implementation processes are the same. Therefore, details are not described herein again.

According to a fourth aspect, an embodiment of this application provides a method for training a generative adversarial network, the generative adversarial network includes a human body generator network and a plurality of coupled adversarial discriminator networks, the coupled adversarial discriminator networks include at least a third discriminator network and a fourth discriminator network, and the method includes:

receiving a human body image and a human body rotation image, where the human body image and the human body rotation image are images before and after a same human body is rotated;

performing pose encoding on the human body image, to obtain pose encoded images of the human body image;

performing pose encoding on the human body rotation image, to obtain pose encoded images of the human body rotation image;

inputting the human body image, the pose encoded images of the human body image, and the pose encoded images of the human body rotation image into the human body generator network, to generate a predicted human body rotation image;

inputting the human body image, the human body rotation image, and the predicted human body rotation image into the third discriminator network, to obtain a third loss;

inputting the human body rotation image, the pose encoded images of the human body rotation image, and the predicted human body rotation image into the fourth discriminator network, to obtain a fourth loss;

updating the human body generator network, the third discriminator network, and the fourth discriminator network based on a total loss of the generative adversarial network, where the total loss of the generative adversarial network is obtained based on a weighted sum of the third loss and the fourth loss; and outputting the trained human body generator network after the total loss of the generative adversarial network is converged.

According to the method for training a generative adversarial network provided in this embodiment of this application, the pose encoding is performed on the human body image and the human body rotation image to obtain the pose encoded images of the human body image and the pose encoded images of the human body rotation image, and the predicted human body rotation image is generated by the human body generator network in the generative adversarial network. Further, the predicted human body rotation image is separately discriminated by using at least two discriminator networks such as the third discriminator network and the fourth discriminator network, to obtain the third loss and the fourth loss, a weighted summation is performed on the third loss and the fourth loss to obtain the total loss of the generative adversarial network, and the human body generator network, the third discriminator network, and the fourth discriminator network in the generative adversarial network are updated by using the total loss. In the foregoing pose encoding manner, descriptions of a human body pose are more accurate and robust, so that the predicted human body rotation image obtained by the human body generator network or the discriminator network by using the foregoing pose encoded images is also closer to an authentic human body rotation image. In addition, in the training method, a rotation angle of training data (the human body image and the human body rotation image) is not limited. Therefore, the network obtained through the training may also be applicable to human body rotation at various different angles, thereby improving operability of human body rotation and user experience. In addition, the third discriminator network and the fourth discriminator network are used, and the third discriminator network and the fourth discriminator network are coupled and adversarial, so that different discriminator networks can discriminate, by using different conditions, the predicted human body rotation image generated by the human body generator network, and discrimination results obtained by the different discriminator networks affect the generative adversarial network. In this way, the generative adversarial network can adjust and control different aspects of the human body image based on the foregoing different conditions, so that a more accurate human body rotation image is output.

A pose encoding manner of the human body image and a pose encoding manner of the human body rotation image are the same as the pose encoding manners provided in the third aspect. Although values of specific landmarks may be different, operation manners are the same. Therefore, details are not described herein again. For a specific manner of obtaining the third loss and the fourth loss, refer to the manner of obtaining the first loss and the second loss in the second aspect. Details are not described herein again.

According to a fifth aspect, an embodiment of this application provides an apparatus for generating a face rotation image. The apparatus includes modules configured to perform the method according to any one of the first aspect or the possible implementations of the first aspect.

According to a sixth aspect, an embodiment of this application provides an apparatus for training a generative adversarial network. The apparatus includes modules configured to perform the method according to any one of the second aspect or the possible implementations of the second aspect.

According to a seventh aspect, an embodiment of this application provides a device for generating a face rotation image. The device includes a processor and a memory. The memory is configured to store a program instruction, and the processor is configured to invoke the program instruction to perform the method according to any one of the first aspect and the possible implementations of the first aspect.

According to an eighth aspect, an embodiment of this application provides a device for training a generative adversarial network. The device includes a processor and a memory. The memory is configured to store a program instruction, and the processor is configured to invoke the program instruction to perform the method according to any one of the second aspect and the possible implementations of the second aspect.

According to a ninth aspect, an embodiment of this application provides a computer-readable storage medium. The computer-readable storage medium stores a program instruction, and when the program instruction is executed by a processor, the method according to any one of the first aspect and the possible implementations of the first aspect is implemented.

According to a tenth aspect, an embodiment of this application provides a computer-readable storage medium. The computer-readable storage medium stores a program instruction, and when the program instruction is executed by a processor, the method according to any one of the second aspect and the possible implementations of the second aspect is implemented.

According to an eleventh aspect, a chip is provided. The chip includes a processor and a data interface, and the processor reads, by using the data interface, an instruction stored in a memory, to perform the method according to any one of the first aspect or the possible implementations of the first aspect.

Optionally, in an implementation, the chip may further include the memory. The memory stores the instruction, the processor is configured to execute the instruction stored in the memory, and when executing the instruction, the processor is configured to perform the method according to any one of the first aspect or the possible implementations of the first aspect.

According to a twelfth aspect, a chip is provided. The chip includes a processor and a data interface, and the processor reads, by using the data interface, an instruction stored in a memory, to perform the method according to any one of the second aspect or the possible implementations of the second aspect.

Optionally, in an implementation, the chip may further include the memory. The memory stores the instruction, the processor is configured to execute the instruction stored in the memory, and when executing the instruction, the processor is configured to perform the method according to any one of the second aspect or the possible implementations of the second aspect.

BRIEF DESCRIPTION OF DRAWINGS

The following describes accompanying drawings used in embodiments of this application.

DESCRIPTION OF EMBODIMENTS

Figure 1:
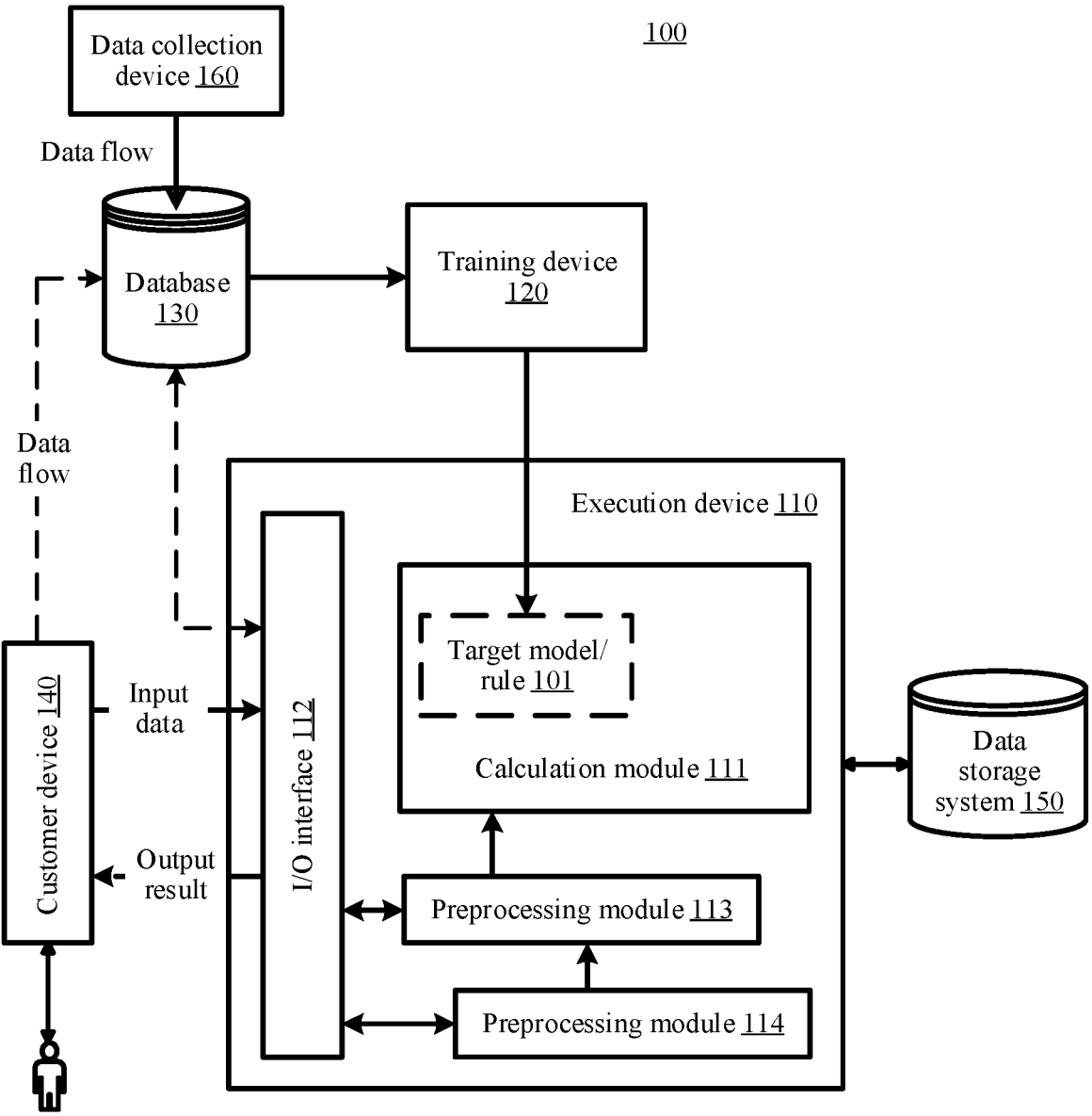
FIG. 1 is a schematic structural diagram of a system architecture according to an embodiment of this application.

The following describes technical solutions in embodiments of the present invention with reference to accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the present invention.

A method for training a generative adversarial network provided in the embodiments of this application relates to computer vision processing, and may be specifically applied to a data processing method such as data training, machine learning, or deep learning. In the method, symbolic and formal intelligent information modeling, extraction, preprocessing, training, and the like are performed on training data (for example, a face image and a face rotation image in this application), to finally obtain a trained generative adversarial network. In addition, in a method for generating a face rotation image provided in the embodiments of this application, the trained generative adversarial network may be used, and input data (such as the face image in this application) is input into the trained generative adversarial network, to obtain output data (such as the face rotation image in this application). It should be noted that the method for training a generative adversarial network and the method for generating a face rotation image that are provided in the embodiments of this application are invented based on a same concept, or may be understood as two parts of a system or two phases, such as a model training phase and a model application phase, of an entire procedure. The methods and apparatuses provided in the embodiments of this application may be applied to facial recognition. For example, when there is only a profile face in a facial recognition process, the method for generating a face rotation image provided in the embodiments of this application may be used. First, a frontal face is generated from the profile face, and then facial recognition is performed based on the frontal face. Because the facial recognition of the frontal face is usually more accurate than that of the profile face, the method can help improve facial recognition accuracy. In addition, the methods and the apparatuses provided in the embodiments of this application may further be used for face recovery. For example, in security surveillance of a public security system, according to the methods provided in the embodiments of this application, a complete frontal face image can be obtained from an image at any angle, face images at other various angles can further be obtained based on the frontal face image or a profile face image, so that information about various angles of the face image is enriched, and a monitored object is more accurately obtained. The methods and the apparatuses provided in the embodiments of this application may further be used to expand a training database. For example, an I/O interface 112 of an execution device 110 shown in FIG. 1 may send, to a database 130, an image (for example, an obtained face rotation image) processed by the execution device and a face image entered by a user together as a training data pair, so that training data maintained by the database 130 is richer, thereby providing richer training data for training work of a training device 120.

In addition, it should be noted that, in the model training phase, the face image and the face rotation image are used as training data and are provided for an initial model for training. In the model application phase, the face image is used as to-be-processed data (the processing herein is face rotation processing) in an actual application, and after related data processing is performed on the to-be-processed data, the processed data is input into a deep neural network to obtain output data: the face rotation image. For brevity and intuitive description, descriptions of the face image and the face rotation image are used in both the training phase and the application phase, but it should not be considered that the face image and the face rotation image in the training phase are necessarily the same as the face image and the face rotation image in the application phase. As described above, when descriptions of the face image and the face rotation image appear in the training phase, the face image and the face rotation image should be understood as training data; or when descriptions of the face image and the face rotation image appear in the application phase, the face image and the face rotation image should be respectively understood as an input and an output in an actual application, and details are not described below again. Certainly, as mentioned in the background, a training database may be expanded through face rotation. In the embodiments of this application, the output data (the face rotation image) is obtained after face rotation processing is performed on the input data (the face image) in the application phase. The input data and the output data herein may be added to the training database as new training data, to expand the training database.

Because the embodiments of this application relate to application of a large quantity of neural networks, for ease of understanding, the following first describes related terms included in the embodiments of this application and related concepts such as a neural network.

(1) Face Rotation

A face image is rotated from one pose angle to another pose angle by using related methods such as image processing, machine learning, and computer graphics, to obtain a corresponding rotated image.

(2) Neural Network

The neural network may include a neural unit. The neural unit may be an operation unit that uses $x_s$ and an intercept 1 as inputs, and an output of the operation unit may be as follows:

$$h_{W,b}(x) = f(W^T x) = f\left(\sum_{s=1}^{n} W_s x_s + b\right) \quad (1\text{-}1)$$

s=1, 2, . . . , or n, n is a natural number greater than 1, $W_s$ is a weight of $x_s$, and b is a bias of the neural unit. f is an activation function of the neural unit, and is used to introduce a non-linear feature to the neural network, to convert an input signal in the neural unit into an output signal. The output signal of the activation function may be used as an input of a next convolution layer. The activation function may be a sigmoid function. The neural network is a network formed by connecting many single neural units together, to be specific, an output of one neural unit may be an input of another neural unit. An input of each neural unit may be connected to a local receptive field of a previous layer to extract a feature of the local receptive field. The local receptive field may be an area including several neural units.

(3) Deep Neural Network

The deep neural network (DNN), also referred to as a multi-layer neural network, may be understood as a neural network having many hidden layers. The "many" herein does not have a special measurement standard. Based on locations of different layers in the DNN, the layers in the DNN may be classified into three types: an input layer, a hidden layer, and an output layer. Usually, the first layer is an input layer, the last layer is an output layer, and layers in the middle are all hidden layers. The layers are fully connected to each other. In other words, any neuron at an $i^{th}$ layer is definitely connected to any neuron at an $(i+1)^{th}$ layer. Although the DNN looks to be very complex, the DNN is actually not complex in terms of work at each layer, and is simply expressed as the following linear relationship expression: $\vec{y}=a(W\vec{x}+\vec{b})$, where $\vec{x}$ is an input vector, $\vec{y}$ is an output vector, $\vec{b}$ is a bias vector, W is a weight matrix (which is also referred to as a coefficient), and a( ) is an activation function. At each layer, the output vector $\vec{x}$ is obtained by performing such a simple operation on the input vector $\vec{y}$. Because there are many layers in the DNN, there are also many coefficients W and many bias vectors $\vec{b}$. Definitions of these parameters in the DNN are as follows: The coefficient W is used as an example. It is assumed that in a DNN having three layers, a linear coefficient from the fourth neuron at the second layer to the second neuron at the third layer is defined as $w_{24}^3$. The upper index 3 represents a quantity of layers at which the coefficient W is located, and the lower index corresponds to an output index 2 of the third layer and an input index 4 of the second layer. In conclusion, a coefficient of a $k^{th}$ neuron at an $(L-1)^{th}$ layer to a $j^{th}$ neuron at an $L^{th}$ layer is defined as $W_{jk}^L$. It should be noted that there is no parameter W at the input layer. In the deep neural network, more hidden layers make the network more capable of describing a complex case in the real world. Theoretically, a model having a larger quantity of parameters indicates higher complexity and a larger "capacity", and indicates that the DNN can complete a more complex learning task. Training of the deep neural network is a process of learning a weight matrix, and a final objective of the training is to obtain a weight matrix of all layers of the trained deep neural network (a weight matrix formed by vectors W at many layers).

(4) Convolutional Neural Network

The convolutional neural network (CNN) is a deep neural network having a convolutional structure. The convolutional neural network includes a feature extractor including a convolution layer and a sub sampling layer. The feature extractor may be considered as a filter. A convolution process may be considered as performing convolution by using a trainable filter and an input image or a convolution feature map (feature map). The convolution layer is a neuron layer that is in the convolutional neural network and that performs convolution processing on an input signal. At the convolution layer in the convolutional neural network, a neuron may be connected only to some adjacent-layer neurons. One convolution layer usually includes several feature maps, and each feature plane may include some rectangularly arranged neural units. Neural units of a same feature map share a weight. The shared weight herein is a convolution kernel. Weight sharing may be understood as that an image information extraction manner is irrelevant to a location. The principle implied herein is that statistical information of a part of an image is the same as that of another part. To be specific, image information that is learned in a part can also be used for another part. Therefore, same image information obtained through learning can be used for all locations in the image. At a same convolution layer, a plurality of convolution kernels may be used to extract different image information. Usually, a larger quantity of convolution kernels indicates richer image information reflected by convolution operations.

A convolution kernel may be initialized in a form of a random-size matrix. An appropriate weight may be obtained by the convolution kernel through learning in a convolutional neural network training process. In addition, a direct benefit brought by the weight sharing is to reduce a quantity of connections between layers of the convolutional neural network, and further reduce an overfitting risk.

(5) Loss Function

In a process of training the deep neural network, because it is expected that an output of the deep neural network is as much as possible close to a value that actually wants to be predicted, a predicted value of a current network and a target value that is actually desired may be compared, and then a weight vector of each layer of the neural network is updated based on a difference between the predicted value and the target value (certainly, there is usually an initialization process before the first update, to be specific, parameters are preconfigured for all the layers of the deep neural network). For example, if the predicted value of the network is large, the weight vector is adjusted to make the predicted value be smaller and adjustment is continuously performed, until the deep neural network can predict the target value that is actually desired or a value that is very close to the target value that is actually desired. Therefore, "how to obtain, through comparison, a difference between a predicted value and a target value" needs to be predefined. This is the loss function or an objective function. The loss function and the objective function are important equations used to measure a difference between a predicted value and a target value. The loss function is used as an example. A higher output value (loss) of the loss function indicates a larger difference, and therefore, training of the deep neural network becomes a process of reducing the loss as much as possible.

(6) Back Propagation Algorithm

The convolutional neural network may correct a value of a parameter in an initial super-resolution model in a training process by using an error back propagation (BP) algorithm, so that a loss of a reconstruction error of the super-resolution model becomes small. Specifically, forward transferring an input signal until an output causes an error loss, and the parameter in the initial super-resolution model is updated by using back propagation error loss information, so that the error loss is converged. The back propagation algorithm is an error-loss-centered back propagation motion intended to obtain a parameter, such as a weight matrix, of an optimal super-resolution model.

(7) Generative Adversarial Network

The generative adversarial network (GAN) is a deep learning model. The model includes at least two modules. One module is a generative model, and the other module is a discriminative model. The two modules are learned through gaming with each other, to generate a better output. Both the generative model and the discriminative model may be neural networks, and may be specifically deep neural networks or convolutional neural networks. A basic principle of the GAN is as follows: Using a GAN for generating an image as an example, it is assumed that there are two networks: G (Generator) and D (Discriminator). G is a network for generating an image. G receives random noise z, and generates an image by using the noise, where the image is denoted as G(z). D is a discriminator network configured to discriminate whether an image is "authentic". An input parameter of D is x, x represents an image, and an output D(x) represents a probability that x is an authentic image. If a value is 1, it indicates that the image is 100% authentic. If a value is 0, it indicates that the image cannot be an authentic image. In a process of training the generative adversarial network, an objective of the generator network G is to generate an authentic image as much as possible to deceive the discriminator network D, and an objective of the discriminator network D is to discriminate between the image generated by G and an authentic image as much as possible. In this way, G and D form a dynamic "game" process, to be specific, "adversary" in the "generative adversarial network". A final game result is that in an ideal state, G may generate an image G(z) that is sufficient to "mix the spurious with the genuine", and it is difficult for D to discriminate whether the image generated by G is authentic, to be specific, D(G(z))=0.5. In this way, an excellent generative model G is obtained, and G can be used to generate an image.

(8) Pixel Value

A pixel value of an image may be a red green blue (RGB) color value, and the pixel value may be a long integer indicating a color. For example, the pixel value is 256*Red+ 100*Green+76Blue, where Blue represents a blue component, Green represents a green component, and Red represents a red component. In each color component, a smaller value indicates lower brightness, and a larger value indicates higher brightness. For a grayscale image, a pixel value may be a grayscale value.

The following describes a system architecture provided in the embodiments of this application.

Referring to FIG. 1, an embodiment of the present invention provides a system architecture 100. As shown in the system architecture 100, a data collection device 160 is configured to collect training data. The training data in this embodiment of this application includes a face image and a face rotation image. The face image is an image before a face is rotated, and the face rotation image is an image obtained after the face in the face image is rotated. The training data is stored in a database 130, and a training device 120 performs training based on the training data maintained in the database 130 to obtain a target model/rule 101. The following describes, in more detail by using Embodiment 1, how the training device 120 obtains the target model/rule 101 based on the training data. The target model/rule 101 can be used to implement the method for generating a face rotation image provided in the embodiments of this application, to be specific, perform related preprocessing on a face image, and input the preprocessed image into the target model/rule 101, to obtain a face rotation image. The target model/rule 101 in this embodiment of this application may be specifically a face generator network. In this embodiment provided in this application, the face generator network is obtained by training a generative adversarial network. It should be noted that, in an actual application, the training data maintained in the database 130 is not necessarily all collected by the data collection device 160, and may be received from another device. In addition, it should be noted that the training device 120 trains the target model/rule 101 not necessarily completely based on the training data maintained in the database 130, and may obtain training data from a cloud or another place to perform model training. The foregoing descriptions should not be construed as a limitation on this embodiment of this application.

The target model/rule 101 obtained based on the training performed by the training device 120 may be applied to different systems or devices, for example, applied to an execution device 110 shown in FIG. 1. The execution device 110 may be a terminal, such as a mobile phone terminal, a tablet computer, a notebook computer, an AR/VR, or an in-vehicle terminal; or may be a server, a cloud, or the like. In FIG. 1, an I/O interface 112 is configured in the execution device 110, and is configured to exchange data with an external device. A user may enter data to the I/O interface 112 by using a customer device 140. In this embodiment of this application, the input data may include a face image entered by the user and a plurality of first training images from a database. Each of the plurality of first training images includes a face (the face is not necessarily the same as a face included in the face image), and presented rotation angles of the faces included in the plurality of first training images are all an angle θ. The angle θ may be preset. For example, it is expected that a face rotation image output by the execution device 110 is an image rotated by θ degrees based on the face image.

A preprocessing module 113 is configured to perform preprocessing based on the input data (for example, the face image) received by the I/O interface 112. In this embodiment of this application, the preprocessing module 113 may be configured to perform pose encoding on the face image based on two or more landmarks in the face image, to obtain pose encoded images of the face image.

A preprocessing module 114 is configured to perform preprocessing based on the input data (for example, the plurality of first training images) received by the I/O interface 112. In this embodiment of this application, the preprocessing module 114 may be configured to obtain a target face image based on the plurality of first training images, and the preprocessing module 113 performs pose encoding on the target face image to obtain pose encoded images of the target face image. The preprocessing module 113 may further generate a to-be-input signal based on the face image, the pose encoded images of the face image, and the pose encoded images of the target face image, and input the to-be-input signal to a calculation module 111; and the calculation module 111 performs calculation based on the target model/rule 101 and the to-be-input signal, to finally obtain a face rotation image.

In a process in which the execution device 110 preprocesses the input data, or in a related process in which the calculation module 111 of the execution device 110 performs calculation or the like, the execution device 110 may invoke data, code, and the like in a data storage system 150 for corresponding processing; and may further store, in the data storage system 150, data, an instruction, and the like that are obtained through the corresponding processing.

Finally, the I/O interface 112 returns a processing result, for example, the foregoing obtained face rotation image, to the customer device 140, to provide the processing result to the user.

It should be noted that the training device 120 may generate, based on different pieces of training data, corresponding target models/rules 101 for different targets or different tasks. The corresponding target models/rules 101 may be used to implement the foregoing targets or complete the foregoing tasks, thereby providing a required result for the user.

In a case shown in FIG. 1, the user may manually provide input data. The input data may be manually provided by using a screen provided by using the I/O interface 112. In another case, the customer device 140 may automatically send input data to the I/O interface 112. If authorization by the user needs to be obtained for the customer device 140 to automatically send the input data, the user may set corresponding permission in the customer device 140. The user may view, on the customer device 140, a result output by the execution device 110. A specific presentation form may be a specific manner such as display, voice, or an action. The customer device 140 may also be used as a data collection end to collect the input data that is input into the I/O interface 112 and an output result that is output from the I/O interface 112, as shown in the figure, use the input data and the output result as new sample data, and store the new sample data in the database 130. Certainly, collection may alternatively not be performed by using the customer device 140, but the I/O interface 112 directly stores, as new sample data, the input data input into the I/O interface 112 and the output result output from the I/O interface 112, as shown in the figure.

It should be noted that FIG. 1 is merely a schematic diagram of a system architecture according to an embodiment of the present invention. A location relationship between a device, a component, a module, and the like shown in the figure constitutes no limitation. For example, in FIG. 1, the data storage system 150 is an external memory relative to the execution device 110. In another case, the data storage system 150 may alternatively be disposed in the execution device 110.

As shown in FIG. 1, the target model/rule 101 is obtained based on the training performed by the training device 120, and the target model/rule 101 in this embodiment of this application may be a face rotation image generative model obtained based on training of a generative adversarial network (GAN). Specifically, the generative adversarial network provided in this embodiment of this application may include at least one face generator network and at least two discriminator networks; the at least two discriminator networks are coupled and adversarial, to generate an adversarial loss; the adversarial loss is used to update the at least one face generator network and the at least two discriminator networks; and the at least one updated face generator network is the face rotation image generative model. In the generative adversarial network provided in this embodiment of this application, the at least one face generator network and the at least two discriminator networks may be specifically convolutional neural networks.

As described in the foregoing basic concept, the convolutional neural network is a deep neural network having a convolutional structure, and is a deep learning architecture. The deep learning architecture is learning of a plurality of layers at different abstract levels by using a machine learning algorithm. As a deep learning architecture, the CNN is a feed-forward artificial neural network. Neurons in the feed-forward artificial neural network may respond to an input image.

Figure 2:
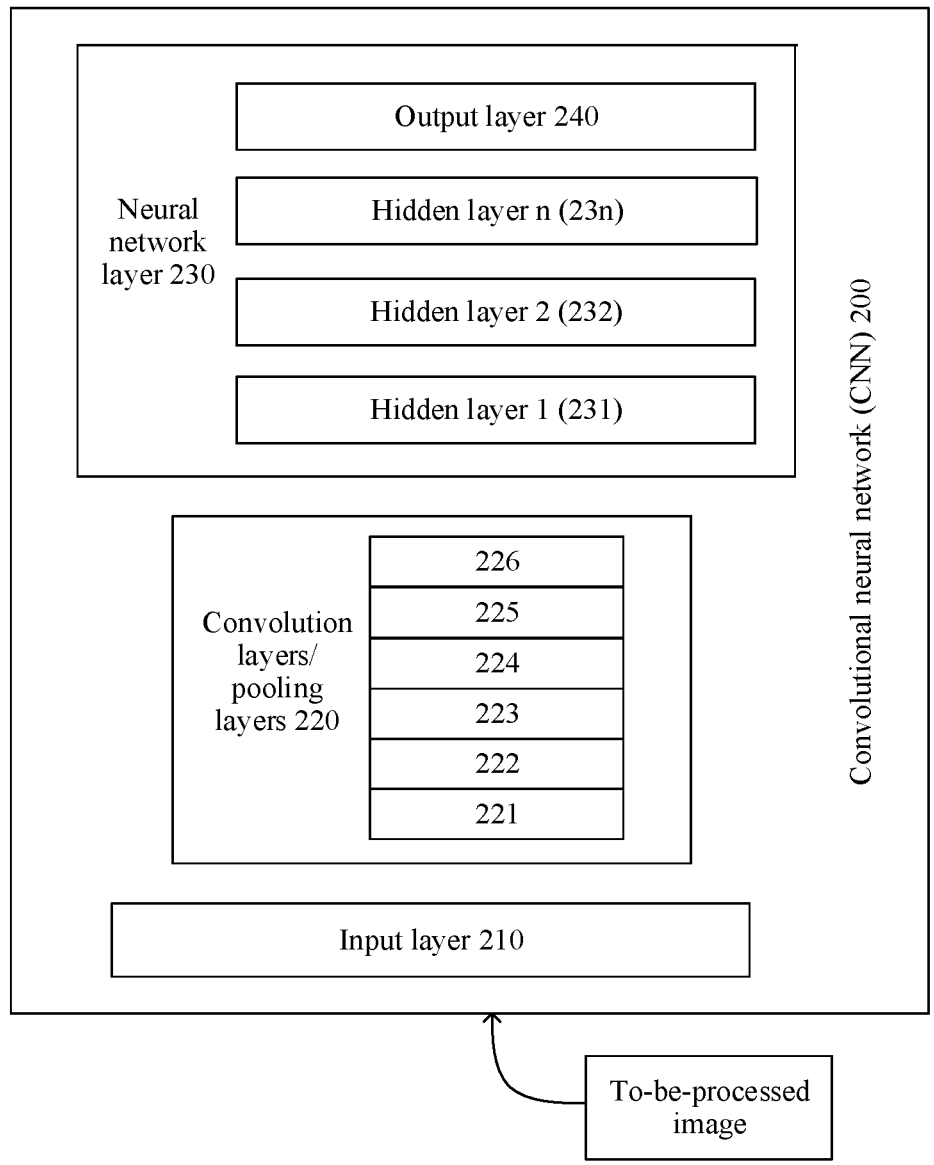
FIG. 2 is a schematic logical diagram of a convolutional neural network according to an embodiment of this application.

As shown in FIG. 2, a convolutional neural network (CNN) 200 may include an input layer 210, convolution layers/pooling layers 220 (where the pooling layers are optional), and a neural network layer 230.

Convolution Layers/Pooling Layers 220:

Convolution Layers:

As shown in FIG. 2, the convolution layers/pooling layers 220 may include, for example, layers 221 to 226. For example, in an implementation, the layer 221 is a convolution layer, the layer 222 is a pooling layer, the layer 223 is a convolution layer, the layer 224 is a pooling layer, the layer 225 is a convolution layer, and the layer 226 is a pooling layer. In another implementation, the layers 221 and 222 are convolution layers, the layer 223 is a pooling layer, the layers 224 and 225 are convolution layers, and the layer 226 is a pooling layer. To be specific, an output of a convolution layer may be used as an input of a following pooling layer, or may be used as an input of another convolution layer to continue to perform convolution.

The following uses the convolution layer 221 as an example to describe an internal working principle of one convolution layer.

The convolution layer 221 may include a plurality of convolution operators. The convolution operator is also referred to as a kernel. A function of the convolution operator in image processing is equivalent to a filter extracting specific information from an input image matrix. The convolution operator may be essentially a weight matrix, and the weight matrix is usually predefined. In a process of performing a convolution operation on an image, the weight matrix is usually processed pixel by pixel (or two pixels by two pixels . . . , which depends on a value of a stride) along a horizontal direction on the input image, to complete work of extracting a specific feature from the image. A size of the weight matrix should be related to a size of the image. It should be noted that a depth dimension of the weight matrix is the same as a depth dimension of the input image. During a convolution operation, the weight matrix extends to an entire depth of the input image. Therefore, convolution with a single weight matrix generates a convolutional output with a single depth dimension. However, in most cases, a single weight matrix is not used, but a plurality of weight matrices with a same size (a quantity of rows×a quantity of columns), namely, a plurality of same-type matrices, are applied. Outputs of the weight matrices are stacked to form a depth dimension of a convolutional image. The dimension herein may be understood as being determined based on the foregoing "plurality". Different weight matrices may be used to extract different features in the image. For example, one weight matrix is used to extract image edge information, another weight matrix is used to extract a specific color of the image, and still another weight matrix is used to blur noise that is not required in the image. Sizes of the plurality of weight matrices (a quantity of rows×a quantity of columns) are the same, sizes of feature maps extracted from the plurality of weight matrices with the same size are also the same, and then the plurality of extracted feature maps with the same size are combined to form an output of the convolution operation.

In an actual application, weighted values in the weight matrices need to be obtained through massive training. The weight matrices formed by the weighted values obtained through the training may be used to extract information from an input image, so that the convolutional neural network 200 performs correct prediction.

When the convolutional neural network 200 has a plurality of convolution layers, an initial convolution layer (for example, the layer 221) usually extracts a relatively large quantity of general features. The general features may also be referred to as low-level features. A feature, for example, a feature such as high level semantics, extracted from a latter convolution layer (for example, the layer 226) becomes more complex with an increase of a depth of the convolutional neural network 200. A feature with higher semantics is more applicable to a to-be-resolved problem.

Pooling Layers:

Because a quantity of training parameters usually needs to be reduced, pooling layers usually need to be periodically introduced after the convolution layers. For the layers 221 to 226 of the convolution layers/pooling layers 220 in FIG. 2, there may be one pooling layer following one convolution layer, or one or more pooling layers following a plurality of convolution layers. During image processing, an only objective of a pooling layer is to reduce a space size of an image. The pooling layer may include an average pooling operator and/or a maximum pooling operator, to perform sampling on an input image to obtain an image with a relatively small size. The average pooling operator may be used to calculate pixel values in the image in a specific range, to generate an average value, which is used as an average pooling result. The maximum pooling operator may select a pixel with a maximum value in a specific range as a maximum pooling result. In addition, as a size of a weight matrix at a convolution layer should be related to a size of an image, the operator at the pooling layer should also be related to the size of the image. A size of an output image obtained through processing at a pooling layer may be smaller than a size of an input image of the pooling layer. Each pixel in the output image of the pooling layer represents an average value or a maximum value of a corresponding sub-region of the input image of the pooling layer.

Neural Network Layer 230:

After processing is performed at the convolution layers/pooling layers 220, the convolutional neural network 200 still cannot output required output information, because as described above, at the convolution layers/pooling layers 220, only a feature is extracted, and parameters resulting from an input image are reduced. However, to generate final output information (required class information or other related information), the convolutional neural network 200 needs to use the neural network layer 230 to generate an output of one required class or a group of required classes. Therefore, the neural network layer 230 may include a plurality of hidden layers (for example, layers 231 to 23n shown in FIG. 2) and an output layer 240. Parameters included in the plurality of hidden layers may be obtained through training in advance based on related training data of a specific task type. For example, the task type may include image recognition, image classification, super-resolution image reconstruction, and the like.

The layer after the plurality of hidden layers in the neural network layer 230, namely, the last layer of the entire convolutional neural network 200 is the output layer 240. The output layer 240 has a loss function similar to classification cross entropy, and is specifically configured to calculate a predicted error. Once forward propagation (propagation in a direction from the input layer 210 to the output layer 240 shown in FIG. 2 is the forward propagation) of the entire convolutional neural network 200 is complete, back propagation (propagation in a direction from the output layer 240 to the input layer 210 shown in FIG. 2 is the back propagation) starts to update a weight value and a bias of each layer mentioned above, to reduce a loss of the convolutional neural network 200, and reduce an error between an ideal result and a result output by the convolutional neural network 200 by using the output layer.

It should be noted that the convolutional neural network 200 shown in FIG. 2 is merely used as an example of a convolutional neural network. In a specific application, the convolutional neural network may alternatively exist in a form of another network model.

The following describes a hardware structure of a chip provided in an embodiment of this application.

Figure 3:
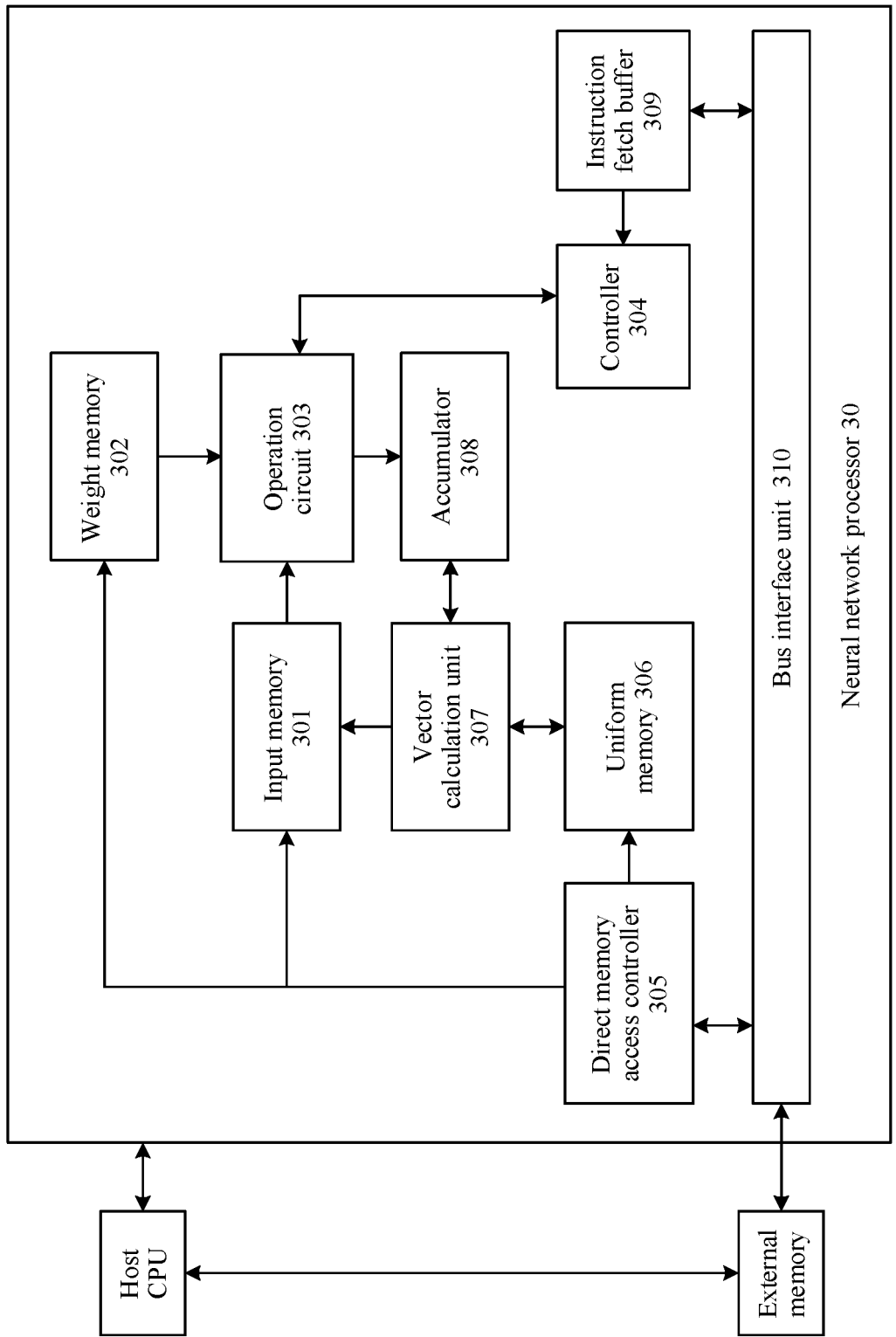
FIG. 3 is a schematic diagram of a hardware structure of a chip according to an embodiment of this application.

FIG. 3 is a hardware structure of a chip provided in an embodiment of the present invention. The chip includes a neural network processor 30. The chip may be disposed in the execution device 110 shown in FIG. 1, to complete calculation work of the calculation module 111. The chip may alternatively be disposed in the training device 120 shown in FIG. 1, to complete training work of the training device 120 and output the target model/rule 101. All algorithms of the layers in the convolutional neural network shown in FIG. 2 may be implemented in the chip shown in FIG. 3.

The neural network processor 30 may be any processor, such as an NPU, a TPU, or a GPU, suitable for large-scale exclusive OR operation processing. The NPU is used as an example. The NPU may be mounted as a coprocessor to a host CPU, and the host CPU assigns a task to the NPU. A core part of the NPU is an operation circuit 303. The operation circuit 303 is controlled by using a controller 304 to extract matrix data from memories (memories 301 and 302) and perform a multiply-add operation.

In some implementations, the operation circuit 303 includes a plurality of processing units (Process Engine, PE) inside. In some implementations, the operation circuit 303 is a two-dimensional systolic array. Alternatively, the operation circuit 303 may be a one-dimensional systolic array or another electronic line capable of performing mathematical operations such as multiplication and addition. In some implementations, the operation circuit 303 is a general-purpose matrix processor.

For example, it is assumed that there are an input matrix A, a weight matrix B, and an output matrix C. The operation circuit 303 obtains weight data of the matrix B from the weight memory 302, and caches the weight data in each PE of the operation circuit 303. The operation circuit 303 obtains input data of the matrix A from the input memory 301, performs a matrix operation based on the input data of the matrix A and the weight data of the matrix B, to obtain a partial result or a final result of the matrix, and stores the result in an accumulator (accumulator) 308.

A uniform memory 306 is configured to store input data and output data. The weight data is migrated to the weight memory 302 by using a direct memory access controller (DMAC) 305. The input data is also migrated to the uniform memory 306 by using the DMAC.

A bus interface unit (BIU) 310 is used for interaction between the DMAC and an instruction fetch buffer 309. The bus interface unit 301 is further used by the instruction fetch buffer 309 to obtain an instruction from an external memory. The bus interface unit 301 is further used by the direct memory access controller 305 to obtain original data of the input matrix A or the weight matrix B from the external memory.

The DMAC is mainly configured to: migrate input data in the external memory DDR to the uniform memory 306, or migrate the weight data to the weight memory 302, or migrate input data to the input memory 301.

A vector calculation unit 307 includes a plurality of operation processing units, and if necessary, performs further processing such as vector multiplication, vector addition, an exponential operation, a logarithmic operation, or value comparison on an output of the operation circuit 303. The vector calculation unit 307 is mainly configured to perform calculation for a non-convolution layer or a fully connected layer (FC) in a neural network, and may specifically process calculation such as Pooling, Normalization, and the like. For example, the vector calculation unit 307 may apply a non-linear function to the output, for example, a vector of an accumulated value, of the operation circuit 303, to generate an activation value. In some implementations, the vector calculation unit 307 generates a normalized value, a combined value, or both.

In some implementations, the vector calculation unit 307 stores a processed vector in the uniform memory 306. In some implementations, a vector processed by the vector calculation unit 307 can be used as an activation input of the operation circuit 303, for example, used in a subsequent layer of the neural network. As shown in FIG. 2, if a current processed layer is a hidden layer 1 (231), the vector processed by the vector calculation unit 307 may further be used in calculation at a hidden layer 2 (232).

The instruction fetch buffer 309 connected to the controller 304 is configured to store an instruction used by the controller 304.

All the uniform memory 306, the input memory 301, the weight memory 302, and the instruction fetch buffer 309 are on-chip memories. The external memory is independent of the NPU hardware architecture.

Operations at various layers in the convolutional neural network shown in FIG. 2 may be performed by the operation circuit 303 or the vector calculation unit 307.

Embodiment 1

Figure 4:
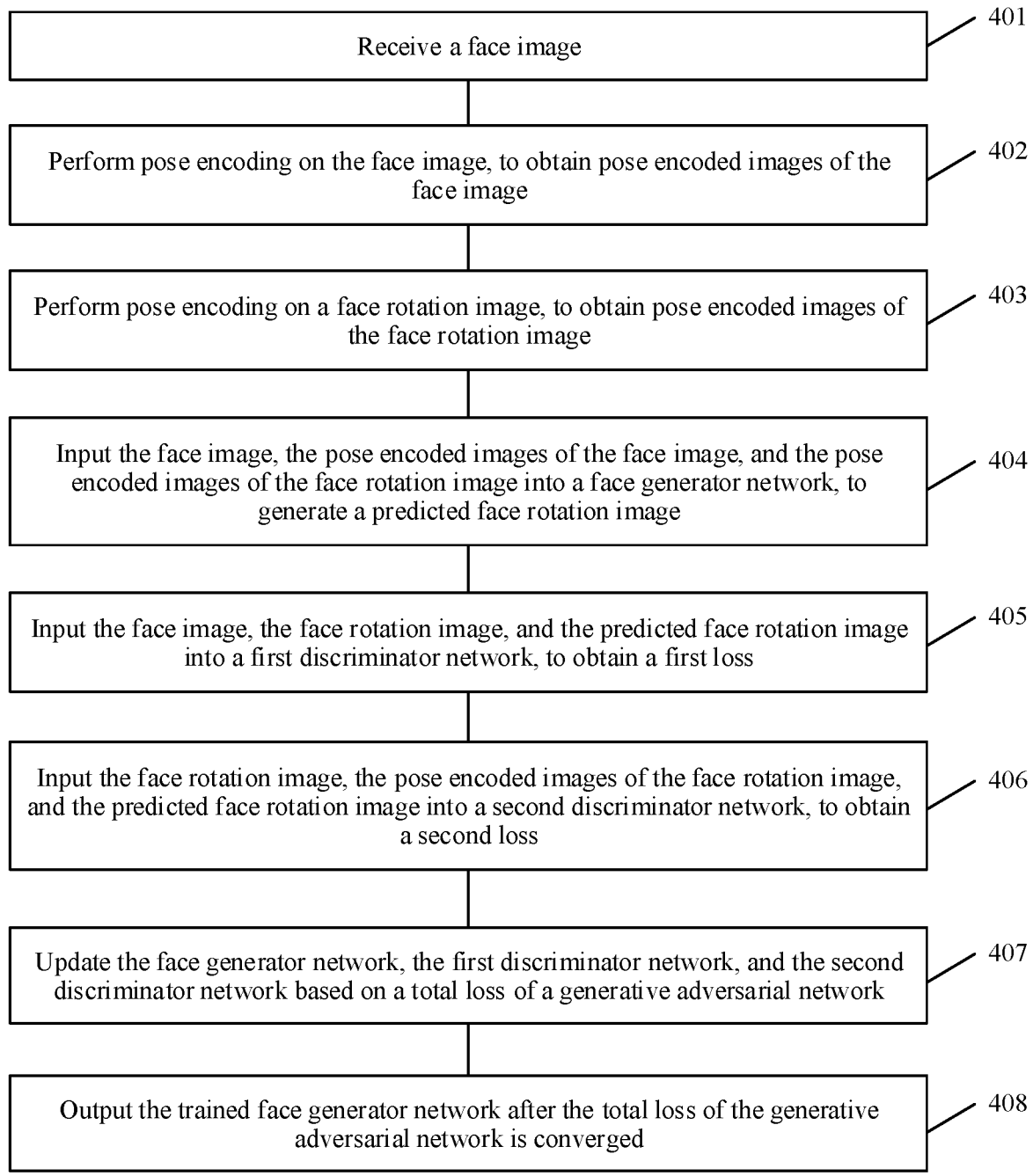
FIG. 4 is a schematic flowchart of a method for training a generative adversarial network according to an embodiment of this application.

FIG. 4 is a method 400 for training a generative adversarial network according to Embodiment 1 of the present invention. The generative adversarial network includes a face generator network and a plurality of coupled adversarial discriminator networks, the coupled adversarial discriminator networks include at least a first discriminator network and a second discriminator network, and the method includes the following steps.

S401: Receive a face image and a face rotation image, where the face image and the face rotation image are images before and after a same face is rotated.

S402: Perform pose encoding on the face image based on two or more landmarks in the face image, to obtain pose encoded images of the face image.

S403: Perform pose encoding on the face rotation image based on two or more landmarks in the face rotation image, to obtain pose encoded images of the face rotation image.

S404: Input the face image, the pose encoded images of the face image, and the pose encoded images of the face rotation image into the face generator network, to generate a predicted face rotation image.

S405: Input the face image, the face rotation image, and the predicted face rotation image into the first discriminator network, to obtain a first loss.

S406: Input the face rotation image, the pose encoded images of the face rotation image, and the predicted face rotation image into the second discriminator network, to obtain a second loss.

S407: Update the face generator network, the first discriminator network, and the second discriminator network based on a total loss of the generative adversarial network, where the total loss of the generative adversarial network is obtained based on a weighted sum of the first loss and the second loss.

S404 to S407 are repeatedly performed until the total loss of the generative adversarial network is converged, and then the following step is performed.

S408: Output the trained face generator network.

The face generator network, the first discriminator network, and the second discriminator network that are updated at this time by performing S407 are configured to perform actions of S404 to S406 at a next time, and iterations are sequentially performed until the total loss of the generative adversarial network is converged, training of the generative adversarial network is ended, and the trained face generator network is output.

According to the method for training a generative adversarial network provided in this embodiment of this application, the pose encoding is performed on the face image and the face rotation image to obtain the pose encoded images of the face image and the pose encoded images of the face rotation image, and the predicted face rotation image is generated by the face generator network in the generative adversarial network. Further, the predicted face rotation image is separately discriminated by using at least the first discriminator network and the second discriminator network, to obtain the first loss and the second loss, a weighted summation is performed on the first loss and the second loss to obtain the total loss of the generative adversarial network, and the face generator network, the first discriminator network, and the second discriminator network in the generative adversarial network are updated by using the total loss. In the foregoing pose encoding manner, descriptions of a face pose are more accurate and robust, so that the predicted face rotation image obtained by the face generator network or the discriminator network by using the foregoing pose encoded images is also closer to an authentic face rotation image. In addition, in the training method, a rotation angle of training data (the face image and the face rotation image) is not limited. Therefore, the network obtained through the training may also be applicable to face rotation at various different angles, thereby improving operability of face rotation and user experience. In addition, the first discriminator network and the second discriminator network are used, and the first discriminator network and the second discriminator network are coupled and adversarial, so that different discriminator networks can discriminate, by using different conditions, the predicted face rotation image generated by the face generator network, and discrimination results obtained by the different discriminator networks affect the generative adversarial network. In this way, the generative adversarial network can adjust and control different aspects of the face image based on the foregoing different conditions, so that a more accurate face rotation image is output.

It should be noted that for the plurality of coupled adversarial discriminator networks, the "coupled" is represented as follows: Losses respectively obtained by the plurality of discriminator networks jointly affect the total loss. For example, in the method 400 provided in this embodiment of this application, the weighted sum of the first loss and the second loss is calculated to obtain the total loss, thereby reflecting a coupling relationship between the first discriminator network and the second discriminator network. The "coupled" herein may also be referred to as "coordination", "joint" or the like, which essentially means that the losses obtained by the plurality of discriminator networks are combined by using a relationship and jointly affect the total loss. The "adversarial" is represented as follows: There is an adversarial relationship between the plurality of discriminator networks and the face generator network. The adversarial relationship is described in detail in the point (7) in the foregoing concept description, to be specific, a "game" between generation and discrimination. Details are not described herein again.

It should be noted that the face image and the face rotation image in Embodiment 1 are essentially training data, and are used to train the generative adversarial network and used as a training data pair, which are images before and after the same face is rotated. It should be noted herein that, for the method and an apparatus provided in this embodiment of this application, that the face rotation needs to be rotation from a frontal face to a profile face, or rotation from a profile face to a frontal face is not limited. Therefore, a requirement for the training data pair is not that one needs to be a frontal face and the other one needs to be a profile face. It should be understood that, a particular rotation angle exists between the face before and after the rotation in the descriptions herein, and the rotation angle may be preset.

In addition, it should be noted that the rotation angle (which is also referred to as a face rotation angle in this specification) should be understood as that a frontal face is considered as 0 degrees, leftward rotation of the face is rotation by a positive angle, and leftward rotation of the face is rotation by a negative angle. From a top view, clockwise rotation is the positive angle, and counterclockwise rotation is the negative angle.

The method 400 may be specifically performed by the training device 120 shown in FIG. 1. The face image and the face rotation image in the method 400 may be the training data maintained in the database 130 shown in FIG. 1. Optionally, S402 and S403 in the method 400 may be performed in the training device 120; or may be performed in advance by another functional module before the training device 120, to be specific, the training data received or obtained from the database 130 is first preprocessed, for example, the pose encoding processes described in S402 and S403 is performed, so that the pose encoded images of the face image and the pose encoded images of the face rotation image are obtained and used as an input of the training device 120, and the training device 120 performs S404 to S408.

Optionally, the method 400 may be processed by a CPU, or may be processed by both a CPU and a GPU; or no GPU may be used, but another processor suitable for neural network computation is used. This is not limited in this application.

The training device 120 may be specifically configured to train the generative adversarial network provided in this embodiment of this application. As described above, the generative adversarial network provided in this embodiment of this application includes the face generator network and the plurality of coupled adversarial discriminator networks. It should be noted that, although only examples of two discriminator networks, namely, the first discriminator network and the second discriminator network, are provided in this embodiment of this application, a specific quantity of discriminator networks, for example, three or four discriminator networks or even more discriminator networks, is not limited in this embodiment of this application. These different discriminator networks may discriminate, based on different discrimination conditions, the predicted image generated by the face generator network, so that the generative adversarial network can adjust and control different aspects of the face image based on these different conditions, so that a more accurate face rotation image is output.

Based on the method 400 provided in Embodiment 1, in a possible implementation, before S407, the method 400 may further include:

S406a: Obtain an authentic image loss based on the face rotation image and the predicted face rotation image, where the authentic image loss includes at least one of a pixel loss, a total variation loss (Total Variation Regularization), and an identity recognition feature loss; and correspondingly, the total loss of the generative adversarial network is obtained based on a weighted sum of the at least one loss in the authentic image loss, the first loss, and the second loss.

When the authentic image loss includes the pixel loss, the total loss is equal to a result obtained by performing a weighted summation on the pixel loss, the first loss, and the second loss; or when the authentic image loss includes the total variation regularization, the total loss is equal to a result obtained by performing a weighted summation on the total variation regularization, the first loss, and the second loss; or when the authentic image loss includes the identity recognition feature loss, the total loss is equal to a result obtained by performing a weighted summation on the identity recognition feature loss, the first loss, and the second loss; or when the authentic image loss includes the pixel loss, the total variation regularization, and the identity recognition feature loss, the total loss is a result obtained by performing a weighted summation on the three losses, the first loss, and the second loss; or when the authentic image loss includes any two of the pixel loss, the total variation regularization, and the identity recognition feature loss, the total loss is obtained by performing a weighted summation on the any two losses, the first loss, and the second loss. Details are not described herein again.

In this implementation, not only the first loss and the second loss are considered, but also the authentic image loss, such as the pixel loss, the total variation regularization, or the identity recognition feature loss, is considered. The pixel loss is introduced, so that on a basis of enriching training conditions of the generative adversarial network, stability of training is further considered and the convergence of the training of the generative adversarial network can be accelerated. The total variation regularization is introduced, so that on a basis of enriching training conditions of the generative adversarial network, a local defect of the generated predicted face image caused by an excessively large local gradient is avoided. The identity recognition feature is used to ensure that identity information remains unchanged for the face included in the generated predicted face rotation image and the face included in the input training data (the face image and the face rotation image). Therefore, the identity recognition feature loss is introduced, so that the generative adversarial network obtained through the training can generate a rotated image with more accurate identity information. When the authentic image loss includes two or three of the foregoing three losses, corresponding effects are considered.

Based on the method 400 provided in Embodiment 1 and the possible implementation thereof, S402 specifically includes:

detecting the face image by using a landmark detection algorithm, to obtain location coordinates respectively corresponding to N landmarks of the face image; constructing N first images having a same size as the face image, where the N first images are in a one-to-one correspondence with the N landmarks; and performing, by using each of the N landmarks as a center, Gaussian blurring on the first image that is in the one-to-one correspondence with the landmark, to obtain N first Gaussian blurred images, where the N first Gaussian blurred images are the pose encoded images of the face image, and N is a positive integer greater than 1.

The constructing N first images having a same size as the face image includes:

generating N all-zero matrices, where each all-zero matrix corresponds to one landmark; and mapping a location of the landmark in the face image to a corresponding location in the all-zero matrix, and changing a value of the corresponding location in the all-zero matrix from 0 to 1, to generate N one-hot code matrices, where the N one-hot code matrices are the N first images.

The one-hot matrix described in this application document is a matrix in which only one vector value is 1 and all other vector values are 0. Details are not described below.

The performing, by using each of the N landmarks as a center, Gaussian blurring on the first image that is in the one-to-one correspondence with the landmark includes:

performing Gaussian blurring on each one-hot code matrix by using a point whose value is 1 in the one-hot code matrix as a center.

In such a manner in which the image pose encoding is implemented by performing Gaussian blurring by using the landmark, descriptions of the face pose are more accurate and robust. The more accurate and robust face pose descriptions can make the predicted face rotation image generated by the face generator network be closer to the authentic face rotation image.

It should be noted that sizes (namely, a quantity of rows and a quantity of columns) of the N all-zero matrices are the same as the size of the face image, because the N one-hot matrices are the N first images, and a value of 1 in each one-hot matrix corresponds to a location of one landmark in the face image. For example, when N is equal to 5, it is assumed that the five landmarks are points corresponding to five key locations, such as a left eyeball center, a right eyeball center, a nose tip, a left mouth corner, and a right mouth corner, of the face. The landmark nose tip is used as an example. Assuming that the nose tip is at a center location of the face image, a value of a center location in the one-hot code matrix corresponding to the nose tip is 1, and values of other locations are still 0. The left mouth corner is used as another example. It is assumed that when coordinate locations of the left mouth corner in the face image are (x, y), a value of a location at the coordinates (x, y) in the one-hot code matrix corresponding to the left mouth corner is 1, and values of other locations are still 0.

In addition, in this application, in descriptions such as an image size, a matrix size, and a pose encoded image size, the sizes may all be understood as a quantity of rows×a quantity of columns. For example, the face image and the face rotation image described in S401 have a same size. This means that the face image and the face rotation image are both presented in a form of a matrix having the same size after the face image and the face rotation image enter the neural network. Certainly, the matrix herein may alternatively be a tensor, and the tensor may be understood as a matrix with a depth. For example, a conventional matrix is X×Y, where X is a quantity of rows of the matrix, and Y is a quantity of columns of the matrix; however, a tensor is X×Y×Z, where Z is a depth of the matrix. It may be understood that, in the foregoing method 400, the face image, the face rotation image, the pose encoded images of the face image, and the pose encoded images of the face rotation image may all have a same size, or may be referred to as same-type matrices. The generated predicted face rotation image can also have the same size as the image or the pose encoded image described above. During the face rotation, the image size is unchanged. Therefore, it may be understood that both input and output image data of the generative adversarial network have the same size.

In addition, it should be further noted that, the face image is detected by using the landmark detection algorithm, to obtain the location coordinates respectively corresponding to the N landmarks of the face image. The N landmarks herein may be 5 as the foregoing example, or certainly may be 10 or a larger or smaller quantity. This is not limited in this solution. A specific value of N may depend on the landmark detection algorithm, to be specific, the quantity of landmarks may be designed in advance based on a requirement. Details are not described herein.

Based on the method 400 provided in Embodiment 1 and the possible implementations thereof, S403 specifically includes:

detecting the face rotation image by using the landmark detection algorithm, to obtain location coordinates respectively corresponding to M landmarks of the face rotation image; constructing M second images having a same size as the face rotation image, where the M second images are in a one-to-one correspondence with the M landmarks; and performing, by using each of the M landmarks as a center, Gaussian blurring on the second image that is in the one-to-one correspondence with the landmark, to obtain M second Gaussian blurred images, where the M second Gaussian blurred images are the pose encoded images of the face rotation image, and M is a positive integer greater than 1.

Herein, a manner of constructing the M second images having the same size as the face rotation image may be understood as the same as the foregoing manner of constructing the N first images having the same size as the face image. Therefore, details are not described herein again.

Based on the method 400 provided in Embodiment 1 and the possible implementations thereof, S405 specifically includes:

determining truth or falsehood of the face rotation image and the predicted face rotation image based on the first discriminator network by using the face image as a discrimination condition of the first discriminator network; and generating the first loss based on a discrimination result, where the first discriminator network includes a binary classification discriminator, and the binary classification discriminator is configured to determine the truth or falsehood.

Specifically, the determining truth or falsehood of the face rotation image and the predicted face rotation image based on the first discriminator network by using the face image as a discrimination condition of the first discriminator network; and generating the first loss based on a discrimination result includes:

$$L^{ii} = E_{I^b \sim H(I^b)}[\log D_{\theta_{ii}}(I^b, I^a)] + E_{\hat{I}^b \sim H(\hat{I}^b)}[1 - D_{\theta_{ii}}(\hat{I}^b, I^a)],$$

where $L^{ii}$ is the first loss; $I^a$ is the face image; $I^b$ is the face rotation image; $\hat{I}^b$ is the predicted face rotation image; $E_{I^b \sim H(I^b)}$ represents an expectation of distribution $H(I^b)$ of the face rotation image $I^b$, namely, a probability that the face rotation image $I^b$ is true; $\log D_{\theta_{ii}}(I^b, I^a)$ represents a loss function of the first discriminator network; $E_{\hat{I}^b \sim H(\hat{I}^b)}$ represents an expectation of distribution $H(\hat{I}^b)$ of the predicted face rotation image $\hat{I}^b$, namely, a probability that the predicted face rotation image $\hat{I}^b$ is true; $D_{\theta_{ii}}(\hat{I}^b, I^a)$ is the first discriminator network using the face image as a condition; $\theta_{ii}$ is a parameter of the first discriminator network; and $(\hat{I}^b, I^a)$ is an input of the first discriminator network.

Based on the method 400 provided in Embodiment 1 and the possible implementations thereof, S406 specifically includes: determining truth or falsehood of the face rotation image and the predicted face rotation image based on the second discriminator network by using the pose encoded images of the face rotation image as a discrimination condition of the second discriminator network; and generating the second loss based on a discrimination result, where the second discriminator network includes a binary classification discriminator, and the binary classification discriminator is configured to determine the truth or falsehood.

Specifically, the determining truth or falsehood of the face rotation image and the predicted face rotation image based on the second discriminator network by using the pose encoded images of the face rotation image as a discrimination condition of the second discriminator network; and generating the second loss based on a discrimination result includes:

$$L^{ip} = E_{I^b \sim H(I^b)}[\log D_{\theta_{ip}}(I^b, P^b)] + E_{\hat{I}^b \sim H(\hat{I}^b)}[1 - D_{\theta_{ip}}(\hat{I}^b, P^b)],$$

where $L^{ip}$ is the second loss; $I^b$ is the face rotation image; $\hat{I}^b$ is the predicted face rotation image; $P^b$ is the pose encoded images of the face rotation image; $E_{I^b \sim H(I^b)}$ represents an expectation of distribution $H(I^b)$ of the face rotation image $I^b$, namely, a probability that the face rotation image $I^b$ is true; $[\log D_{\theta_{ip}}(I^b, P^b)]$ represents a loss function of the second discriminator network; $E_{\hat{I}^b \sim H(\hat{I}^b)}$ represents an expectation of distribution $H(\hat{I}^b)$ of the predicted face rotation image $\hat{I}^b$, namely, a probability that the predicted face rotation image $\hat{I}^b$ is true; $D_{\theta_{ip}}(\hat{I}^b, P^b)$ is the second discriminator network using the pose encoded images of the face rotation image as a condition; $\theta_{ip}$ is a parameter of the second discriminator network; and $(\hat{I}^b, P^b)$ is an input of the second discriminator network.

Based on the method 400 provided in Embodiment 1 and the possible implementations thereof, when the authentic image loss includes the pixel loss, S406a may specifically include performing the following calculation:

$$L_{pix} = \frac{1}{S}\sum_{s=1}^{S}\left\|\hat{I}^b - I^b\right\|_1^s,$$

where $L_{pix}$ is the pixel loss, S is a scale metric, $\hat{I}^b$ is the predicted face rotation image, $I^b$ is the face rotation image, and $\|\hat{I}^b - I^b\|_1^s$ represents that a 1-norm loss of a pixel difference is calculated when the predicted face rotation image and the face rotation image are scaled to the S scale metric.

Based on the method 400 provided in Embodiment 1 and the possible implementations thereof, when the authentic image loss includes the total variation regularization, S406a may specifically include performing the following calculation:

$$L_{tv} = \sum_{c=1}^{C}\sum_{w,h=1}^{W,H}\left|\hat{I}^b_{w+1,h,c} - \hat{I}^b_{w,h,c}\right| + \left|\hat{I}^b_{w+1,h,c} - \hat{I}^b_{w,h,c}\right|,$$

where $L_{tv}$ is the total variation regularization, to be specific, a sum of first-order gradient absolute values of the predicted face rotation image $\hat{I}^b$ in both horizontal and vertical directions, where W represents a width of the predicted face rotation image, H represents a height of the predicted face rotation image, and C represents a quantity of channels of the predicted face rotation image.

Based on the method 400 provided in Embodiment 1 and the possible implementations thereof, when the authentic image loss includes the total variation regularization, S406a may specifically include performing the following calculation:

$$L_{ip} = \|D_f^p(\hat{I}^b) - D_f^p(I^b)\|_2 + \|D_f^{fc}(\hat{I}^b) - D_f^{fc}(I^b)\|, \text{ where}$$

an identity recognition feature is used to ensure that identity information remains unchanged for the predicted face rotation image and the face image; $L^{ip}$ indicates the identity recognition feature loss; and f is a pre-trained facial recognition model, the facial recognition model f is a deep neural network, and the deep neural network includes at least one pooling layer and at least one fully connected layer, where $D_f^p(\cdot)$ represents an output of the last pooling layer of the facial recognition model f, and $D_f^{fc}(\cdot)$ represents an output of the last fully connected layer of the facial recognition model f.

Based on the method 400 provided in Embodiment 1 and the possible implementations thereof, S407 may specifically include:

updating the face generator network, so that an error of the face generator network is the minimum;

updating the first discriminator network and the second discriminator network, so that values of the first loss and the second loss are the maximum; and alternately iterating the updates until the generative adversarial network is converged.

Specifically, the foregoing update process may be understood as follows:

The face generator network is updated based on the total loss, so that the predicted face rotation image generated by the face generator network is to confuse the first discriminator network and the second discriminator network as much as possible. In other words, an objective of updating the face generator network is to enable the face generator network to generate as much as possible the predicted face rotation image that it is difficult for discriminator networks to identify truth or falsehood, and the discriminator networks herein include the first discriminator network and the second discriminator network. In the following descriptions, the discriminator networks include the first discriminator network and the second discriminator network, and details are not described again.

The first discriminator network and the second discriminator network are updated based on the total loss, so that the values of the first loss and the second loss are the maximum. In a vivid manner, an objective of updating the first discriminator network and the second discriminator network is to enable the first discriminator network and the second discriminator network to identify as much as possible the predicted face rotation image generated by the face generator network, to be specific, identify whether the predicted face rotation image is true or false.

As described above, the face generator network is updated to confuse the discriminator network, and the discriminator network is updated to prevent the discriminator network from being confused, so that the face generator network and the discriminator network are adversarial with each other to form a game, and finally achieve dynamic balancing, to be specific, the foregoing updates are alternately iterated until the generative adversarial network is converged.

It should be noted that, the updating the face generator network, so that an error of the face generator network is the minimum herein means that a possibility that the predicted face rotation image generated by the face generator network is identified by the discriminator network as true or false is as small as possible.

It should be further noted that, a specific implementation of the updating the first discriminator network and the second discriminator network, so that values of the first loss and the second loss are the maximum is described as follows:

Using an example in which the first discriminator network is updated, it may be understood that, as a binary classification discriminator, the first discriminator network may have two nodes, each is for outputting. One node is configured to output a probability that the predicted face rotation image is discriminated as true, for example, 0.3, and the other node is configured to output a probability that the predicted face rotation image is discriminated as false. Obviously, if the probability that the predicted face rotation image is discriminated as true is 0.3, the probability that the predicted face rotation image is discriminated as false is 1−0.3=0.7. In this case, the value of the first loss is 0.7, to be specific, the value of the first loss is a larger one between values output by the two nodes. For another example, if the probability that the predicted face rotation image is discriminated as true is 0.9, the probability that the predicted face rotation image is discriminated as false is 0.1. In this case, the value of first loss is 0.9. Therefore, the first discriminator network is updated to maximize the value of the first loss with the objective of updating the first discriminator network to enable the first discriminator network to identify as much as possible a difference between a predicted image generated by the face generator network and an authentic image. The foregoing predicted image is the predicted face rotation image, and the authentic image herein is the received face rotation image.

It can be learned that during the training of the generative adversarial network, the face generator network and the discriminator networks (including the first discriminator network and the second discriminator network) are in an adversarial relationship, or this is referred to as a "game" process. The face generator network needs to try to generate a predicted image that is difficult to be identified, and the discriminator network needs to try to identify a difference between the predicted image and an authentic image. Such a dynamic "game" is specifically reflected in updating of a parameter. The update is stopped, in other words, the training of the generative adversarial network is stopped, when the updated parameter enables the face generator network and the discriminator network to be dynamically balanced, to be specific, an overall optimal state is achieved, and the trained face generator network is output.

In the foregoing generative adversarial network, the first discriminator network uses the face image as the discrimination condition, the second discriminator network uses the pose encoded images of the face rotation image as the discrimination condition, and the discrimination results finally obtained by the first discriminator network and the second discriminator network are: the first loss and the second loss. In addition, a weighted summation result obtained by performing the weighted summation on the first loss and the second loss is used as the total loss of the generative adversarial network, and the total loss is used to update the generative adversarial network (including the face generator network, the first discriminator network, and the second discriminator network), and the foregoing steps are iterated until the entire generative adversarial network achieves dynamic balancing or global optimization. In this case, the update is stopped, and the trained face generator network is output. Therefore, the face generator network obtained through the training can very well grasp information of both face apparent authenticity and the face pose. In conclusion, because the first discriminator network uses the face image as the discrimination condition, it may be understood that the face apparent authenticity is controlled by the first discriminator network. Because the second discriminator network uses the pose encoded images of the face rotation image as the discrimination condition, it may be understood that the face pose is controlled by the second discriminator network.

Embodiment 2

Figure 5:
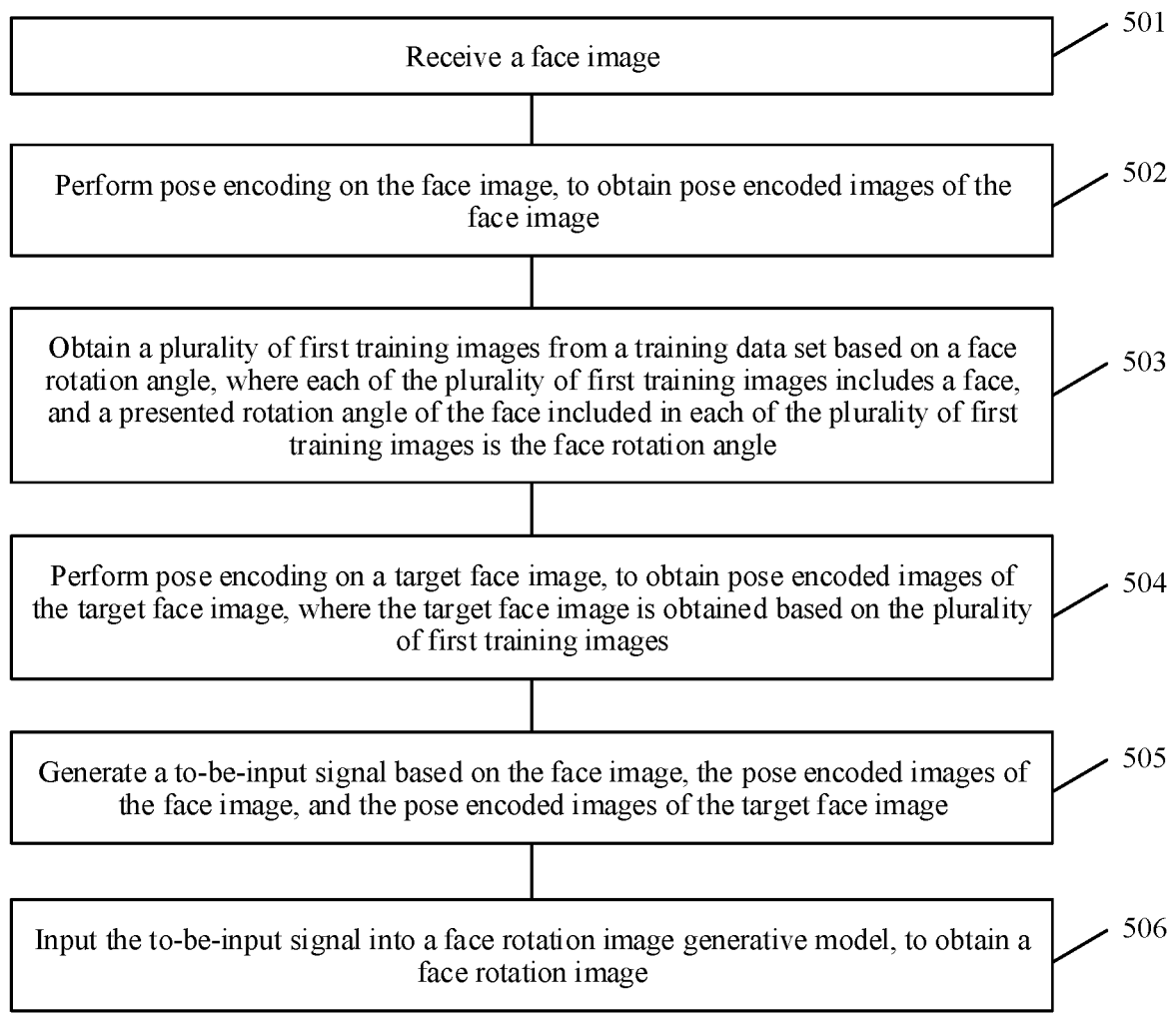
FIG. 5 is a schematic flowchart of a method for generating a face rotation image according to an embodiment of this application.

FIG. 5 is a method 500 for generating a face rotation image according to Embodiment 2 of the present invention. The method includes the following steps.

S501: Receive a face image.

S502: Perform pose encoding on the face image based on two or more landmarks in the face image, to obtain pose encoded images of the face image.

S503: Obtain a plurality of first training images from a training data set based on a face rotation angle, where each of the plurality of first training images includes a face, and a presented rotation angle of the face included in each of the plurality of first training images is the face rotation angle.

S504: Perform pose encoding on a target face image based on two or more landmarks in the target face image, to obtain pose encoded images of the target face image, where the target face image is obtained based on the plurality of first training images.

S505: Generate a to-be-input signal based on the face image, the pose encoded images of the face image, and the pose encoded images of the target face image, where a size of the face image, a size of the pose encoded images of the face image, and a size of the pose encoded images of the target face image are the same.

S506: Input the to-be-input signal into a face rotation image generative model, to obtain a face rotation image.

According to the method for generating a face rotation image provided in this embodiment of this application, the pose encoding is performed on the face image and the target face image, so that the input signal of the face rotation image generative model is obtained, and the face rotation image is further generated by using the face rotation image generative model. Because a face pose is described more accurately and robustly in the pose encoding manner, the generated face rotation image is more accurate. In addition, because the target face image provided in the method is obtained based on the plurality of first training images, the presented rotation angles of the faces included in the plurality of first training image are the same, and the rotation angle herein may be preset by a user. For example, the user enters a face image, and instructs an image generation device to generate a face rotation image at a preset angle, so that the presented rotation angles of the faces included in the foregoing plurality of first training images are all the preset angle. According to the setting, the method for generating a face rotation image provided in this embodiment of this application imposes no limitation on the face rotation angle, to be specific, face rotation at various angles can be implemented.

The method 500 may be specifically performed by the execution device 110 shown in FIG. 1. The face image in the method 500 may be the input data provided by the customer device 140 shown in FIG. 1. The preprocessing module 113 in the execution device 110 may be configured to perform the pose encoding processes described in S502 and S504 in the method 500, and the preprocessing module 114 in the execution device 110 may be configured to perform S503 in the method 500. The preprocessing module 113 may further be configured to perform S505, and the calculation module 111 in the execution device 110 may be configured to perform S506.

The execution device 110 may be specifically configured to train the generative adversarial network provided in this embodiment of this application.

It should be noted that, in the method 500, the plurality of first training images are obtained from the training data set based on the face rotation angle, each of the plurality of first training images includes the face, and the face herein and a face in the face image do not need to be the same. Actually, in the method 500, the face image may be a real-time to-be-rotated face entered by the user, while the plurality of first training images are a training data set maintained by a database, so that it may be considered that the faces included in the plurality of first training images do not have a direct relationship with the face included in the face image. Certainly, the face included in the face image may also appear in the database and be used as training data.

Optionally, the method 500 may be processed by a CPU, or may be processed by both a CPU and a GPU; or no GPU may be used, but another processor suitable for neural network computation is used. This is not limited in this application.

It should be noted that in the method 500, the generating a to-be-input signal based on the face image, the pose encoded images of the face image, and the pose encoded images of the target face image may be specifically obtaining the to-be-input signal by fusing the face image, the pose encoded images of the face image, and the pose encoded images of the target face image in a feature fusion manner. The feature fusion is organically combining discriminative and complementary features together as a unified feature in a particular manner. The feature fusion is a common technical means in the field of biometric recognition technologies, and the feature fusion may be implemented in a plurality of manners. Information included in the fused feature is more accurate and richer. It may be understood that, compared with information included in any image or pose encoded image of the face image, the pose encoded images of the face image, and the pose encoded images of the target face image, information included in the to-be-input signal is more accurate and richer. Therefore, the face rotation image is generated by using the to-be-input signal, so that the generated face rotation image is more accurate. When the face rotation method is applied to a facial recognition application scenario, a more accurate face rotation image can be used to improve facial recognition accuracy.

Based on the method 500 provided in Embodiment 2, in a possible implementation, S502 may specifically include:

detecting the face image by using a landmark detection algorithm, to obtain location coordinates respectively corresponding to N landmarks of the face image, where N is an integer greater than 1;

constructing N first images having a same size as the face image, where the N first images are in a one-to-one correspondence with the N landmarks; and performing, by using each of the N landmarks as a center, Gaussian blurring on the first image that is in the one-to-one correspondence with the landmark, to obtain N first Gaussian blurred images, where the N first Gaussian blurred images are the pose encoded images of the face image.

The constructing N first images having a same size as the face image includes:

generating N all-zero matrices, where each all-zero matrix corresponds to one landmark; and mapping a location of the landmark in the face image to a corresponding location in the all-zero matrix, and changing a value of the corresponding location in the all-zero matrix from 0 to 1, to generate N one-hot code matrices, where the N one-hot code matrices are the N first images.

The performing, by using each of the N landmarks as a center, Gaussian blurring on the first image that is in the one-to-one correspondence with the landmark includes:

performing Gaussian blurring on each one-hot code matrix by using a point whose value is 1 in the one-hot code matrix as a center.

In such a manner in which the image pose encoding is implemented by performing Gaussian blurring by using the landmark, descriptions of the face pose are more accurate and robust. The more accurate and robust face pose descriptions can make the face rotation image generated by the face rotation image generative model be closer to an authentic face rotation image.

Based on the method 500 provided in Embodiment 2 and the possible implementation thereof, S504 specifically includes:

detecting the target face image by using the landmark detection algorithm, to obtain location coordinates respectively corresponding to M landmarks of the target face image, where M is an integer greater than 1;

constructing M second images having a same size as the target face image, where the M second images are in a one-to-one correspondence with the M landmarks; and performing, by using each of the M landmarks as a center, Gaussian blurring on the second image that is in the one-to-one correspondence with the landmark, to obtain M second Gaussian blurred images, where the M second Gaussian blurred images are the pose encoded images of the target face image.

A manner of constructing the M second images having the same size as the target face image is the same as the foregoing manner of constructing the N first image having the same size as the face image. Therefore, details are not described herein again.

Based on the method 500 provided in Embodiment 2 and the possible implementations thereof, in a possible implementation, that the target face image is obtained based on the plurality of first training images includes:

the target face image is obtained based on an average value of pose encoded images of the plurality of first training images.

It should be noted that, the pose encoded images of the plurality of first training images may be obtained by using a pose encoding method that is the same as the pose encoding method described in S502 and S504. To be specific, for each first training image, the first training image is first detected by using the landmark detection algorithm, to obtain the location coordinates respectively corresponding to the N facial landmarks in the first training images, then the N one-hot codes that are in a one-to-one correspondence with the N landmarks are generated based on the location coordinates respectively corresponding to the N landmarks, and then Gaussian blurring is performed by using the point whose value is 1 in each one-hot code as the center, to obtain the N Gaussian blurred images. In this way, after the pose encoding is performed on each first training image, the average is calculated. A specific manner of calculating the average may be adding up pixel values at locations corresponding to all the Gaussian blurred images, and then calculating an average.

Based on the method 500 provided in Embodiment 2 and the possible implementations thereof, in a possible implementation, the face rotation image generative model is obtained based on training of a generative adversarial network; the generative adversarial network includes at least one face generator network and at least two discriminator networks; the at least two discriminator networks are coupled and adversarial, to generate an adversarial loss; the adversarial loss is used to update the at least one face generator network and the at least two discriminator networks; and the at least one updated face generator network is the face rotation image generative model.

The face rotation image generative model herein may be the face generator network obtained through the training in Embodiment 1.

It may be understood that Embodiment 1 is a training phase (a phase performed by the training device 120 shown in FIG. 1) of the face generator network, and specific training is performed by using the generative adversarial network provided in any one of Embodiment 1 and the possible implementations based on Embodiment 1. Embodiment 2 may be understood as an application phase (a phase performed by the execution device 110 shown in FIG. 1) of the face generator network, and may be specifically represented that an output image, namely, the face rotation image in Embodiment 2, is obtained by using the face generator network obtained through the training in Embodiment 1 and based on a to-be-rotated face image, which is also referred to as the face rotation image in Embodiment 2, entered by a user. Certainly, in Embodiment 2, before the to-be-input signal is input into the face rotation image generative model, corresponding preprocessing, for example, the pose encoding processes described in S502 and S504 in Embodiment 2, is performed on the to-be-input signal, to obtain the corresponding pose encoded images. In addition, feature fusion is performed, by using the foregoing feature fusion manner, on the pose encoded images of the face image output in S502, the pose encoded images of the target face image output in S504, and the face image received in S501, to obtain a richer feature diagram, namely, the to-be-input signal. The to-be-input signal integrates features in S501, S502, and S504. In this way, face rotation image obtained by the face rotation image generative model based on the to-be-input signal has better quality, to be specific, is closer to the authentic face rotation image.

As described above, although in the network training phase of Embodiment 1 and the network application phase of Embodiment 2, for brevity and intuitive expression, descriptions of the face image and the face rotation image are used, and the two embodiments are different embodiments and are respectively used to indicate different phases. Therefore, the face images in the two embodiments should not be understood as a same image. Actually, the face image in Embodiment 1 is training data, and may indicate an authentic image; or may be a virtual image obtained through an interpolation operation; however, the face image in Embodiment 2 is usually an authentic face image entered by a user. Similarly, the face rotation image in Embodiment 1 is also a training image, and may be an authentic image, or may be a virtual image obtained through an interpolation operation. The face rotation image in Embodiment 1 and the face image in Embodiment 1 form a training data pair for training the generative adversarial network. The face rotation image in Embodiment 2 is an image generated by the face rotation image generative model, and the image should be theoretically the same as an authentic face rotation image as much as possible, but is specifically determined based on a capability of the method for generating a face rotation image.

The method for generating a face rotation image and the method for training a generative adversarial network in the embodiments of this application are described above in detail with reference to FIG. 1 to FIG. 5. An apparatus for generating a face rotation image and an apparatus for training a generative adversarial network in embodiments of this application are described below with reference to FIG. 6 to FIG. 9. It should be understood that action recognition apparatuses shown in FIG. 6 to FIG. 9 may be specifically devices having an image processing function, such as a monitoring device, a terminal device, a network server, and a network cloud platform. The apparatuses shown in FIG. 6 to FIG. 9 may perform the steps of the corresponding methods in the embodiments of this application. For brevity, repeated descriptions are appropriately omitted below.

Figure 6:
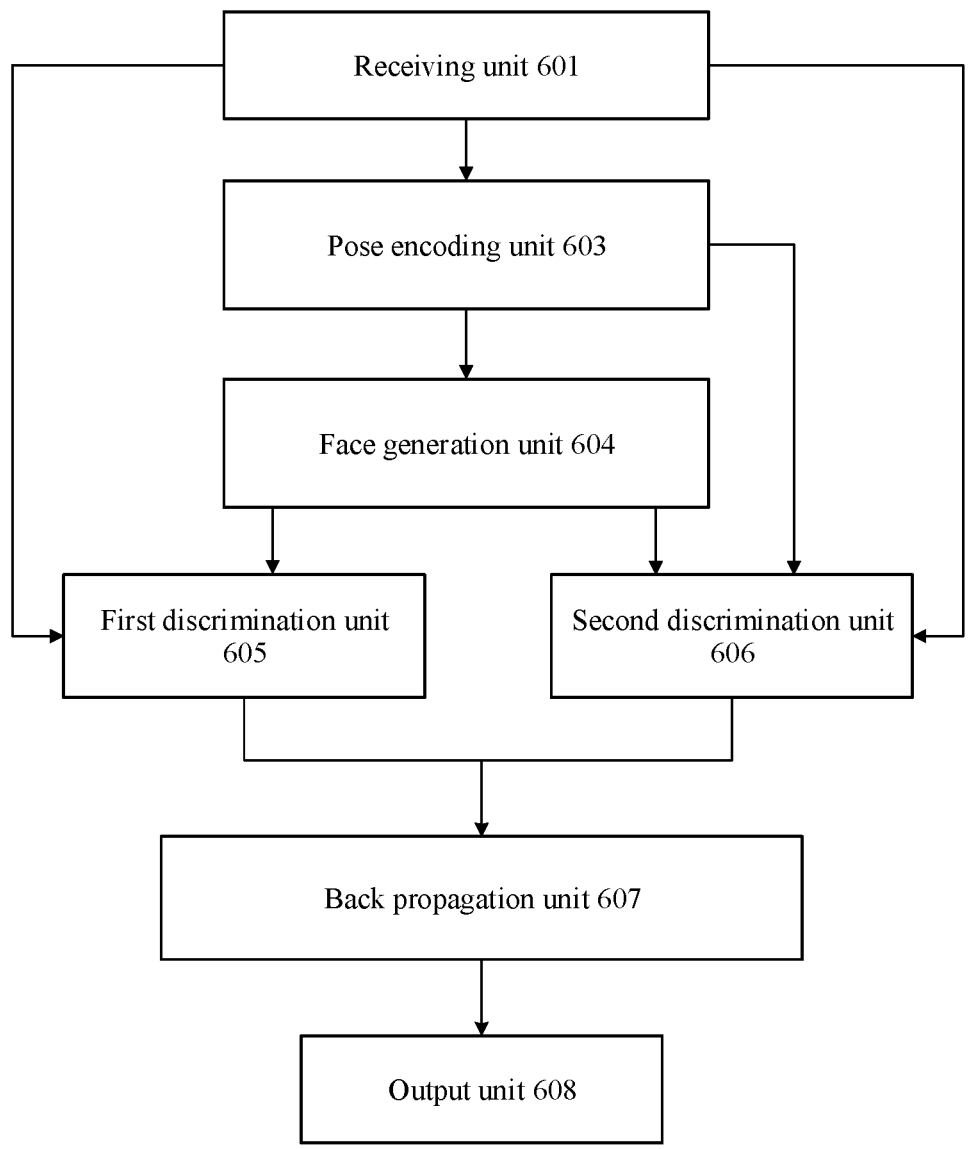
FIG. 6 is a schematic block diagram of an apparatus for training a generative adversarial network according to an embodiment of this application.

FIG. 6 is a schematic block diagram of an apparatus 600 for training a generative adversarial network according to an embodiment of this application. The generative adversarial network includes a face generator network and a plurality of coupled adversarial discriminator networks, the coupled adversarial discriminator networks include at least a first discriminator network and a second discriminator network, and the apparatus 600 includes:

a receiving unit 601, configured to receive a face image and a face rotation image, where the face image and the face rotation image are images before and after a same face is rotated;

a pose encoding unit 603, configured to perform pose encoding on the face image based on two or more landmarks in the face image, to obtain pose encoded images of the face image, where the pose encoding unit 603 is further configured to perform pose encoding on the face rotation image based on two or more landmarks in the face rotation image, to obtain pose encoded images of the face rotation image;

a face generation unit 604, configured to input the face image, the pose encoded images of the face image, and the pose encoded images of the face rotation image into the face generator network, to generate a predicted face rotation image;

a first discrimination unit 605, configured to input the face image, the face rotation image, and the predicted face rotation image into the first discriminator network, to obtain a first loss;

a second discrimination unit 606, configured to input the face rotation image, the pose encoded images of the face rotation image, and the predicted face rotation image into the second discriminator network, to obtain a second loss;

a back propagation unit 607, configured to update the face generator network, the first discriminator network, and the second discriminator network based on a total loss of the generative adversarial network, where the total loss of the generative adversarial network is obtained based on a weighted sum of the first loss and the second loss; and an output unit 608, configured to output the trained face generator network after the total loss of the generative adversarial network is converged.

According to the apparatus for training a generative adversarial network provided in this embodiment of this application, the pose encoding is performed on the face image and the face rotation image to obtain the pose encoded images of the face image and the pose encoded images of the face rotation image, and the predicted face rotation image is generated by the face generator network in the generative adversarial network. Further, the predicted face rotation image is separately discriminated by using at least the first discriminator network and the second discriminator network, to obtain the first loss and the second loss, a weighted summation is performed on the first loss and the second loss to obtain the total loss of the generative adversarial network, and the face generator network, the first discriminator network, and the second discriminator network in the generative adversarial network are updated by using the total loss. In the foregoing pose encoding manner, descriptions of a face pose are more accurate and robust, so that the predicted face rotation image obtained by the face generator network or the discriminator network by using the foregoing pose encoded images is also closer to an authentic face rotation image. In addition, in the training apparatus, a rotation angle of training data (the face image and the face rotation image) is not limited. Therefore, the network obtained through the training may also be applicable to face rotation at various different angles, thereby improving operability of face rotation and user experience. In addition, the first discriminator network and the second discriminator network are used, and the first discriminator network and the second discriminator network are coupled and adversarial, so that different discriminator networks can discriminate, by using different conditions, the predicted face rotation image generated by the face generator network, and discrimination results obtained by the different discriminator networks affect the generative adversarial network. In this way, the generative adversarial network can adjust and control different aspects of the face image based on the foregoing different conditions, so that a more accurate face rotation image is output.

Figure 7:
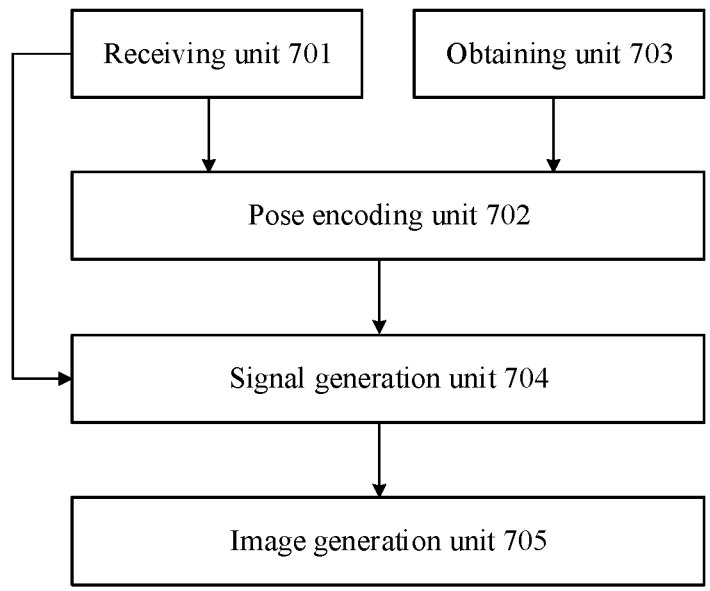
FIG. 7 is a schematic block diagram of an apparatus for generating a face rotation image according to an embodiment of this application.

FIG. 7 is a schematic block diagram of an apparatus 700 for generating a face rotation image according to an embodiment of this application. The apparatus 700 includes:

a receiving unit 701, configured to receive a face image;

a pose encoding unit 702, configured to perform pose encoding on the face image based on two or more landmarks in the face image, to obtain pose encoded images of the face image;

an obtaining unit 703, configured to obtain a plurality of first training images from a training data set based on a face rotation angle, where each of the plurality of first training images includes a face, and a presented rotation angle of the face included in each of the plurality of first training images is the face rotation angle, where the pose encoding unit 702 is further configured to perform pose encoding on a target face image based on two or more landmarks in the target face image, to obtain pose encoded images of the target face image, where the target face image is obtained based on the plurality of first training images;

a signal generation unit 704, configured to generate a to-be-input signal based on the face image, the pose encoded images of the face image, and the pose encoded images of the target face image, where a size of the face image, a size of the pose encoded images of the face image, and a size of the pose encoded images of the target face image are the same; and an image generation unit 705, configured to input the to-be-input signal into a face rotation image generative model, to obtain a face rotation image.

According to the method for generating a face rotation image provided in this embodiment of this application, the pose encoding is performed on the face image and the target face image, so that the input signal of the face rotation image generative model is obtained, and the face rotation image is further generated by using the face rotation image generative model. Because a face pose is described more accurately and robustly in the pose encoding manner, the generated face rotation image is more accurate. In addition, because the target face image provided in the method is obtained based on the plurality of first training images, the presented rotation angles of the faces included in the plurality of first training image are the same, and the rotation angle herein may be preset by a user. For example, the user enters a face image, and instructs an image generation device to generate a face rotation image at a preset angle, so that the presented rotation angles of the faces included in the foregoing plurality of first training images are all the preset angle. According to the setting, the method for generating a face rotation image provided in this embodiment of this application imposes no limitation on the face rotation angle, to be specific, face rotation at various angles can be implemented.

Figure 8:
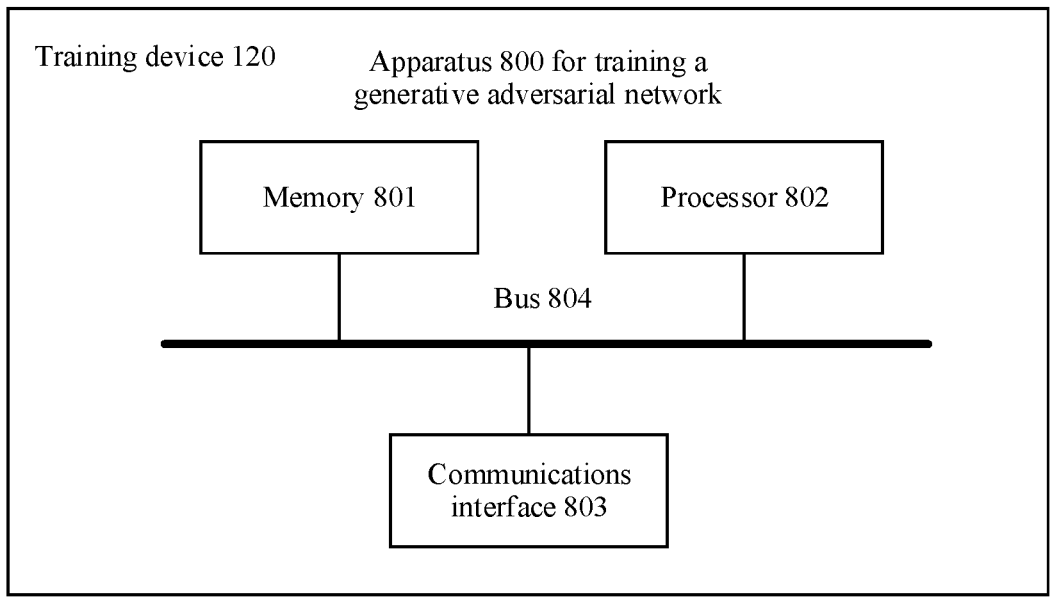
FIG. 8 is a schematic diagram of a hardware structure of an apparatus for training a generative adversarial network according to an embodiment of this application.

FIG. 8 is a schematic diagram of a hardware structure of an apparatus 800 for training a generative adversarial network according to an embodiment of this application. The apparatus 800 (the apparatus 800 may be specifically a computer device) for training a generative adversarial network shown in FIG. 8 includes a memory 801, a processor 802, a communications interface 803, and a bus 804. A communication connection between the memory 801, the processor 802, and the communications interface 803 is implemented by using the bus 804.

The memory 801 may be a read-only memory (ROM), a static storage device, a dynamic storage device, or a random access memory (RAM). The memory 801 may store a program. When the program stored in the memory 801 is executed by the processor 802, the processor 802 and the communications interface 803 are configured to perform the steps of the method for training a generative adversarial network in the embodiments of this application.

The processor 802 may be a general-purpose central processing unit (CPU), a microprocessor, an application-specific integrated circuit (ASIC), a graphics processing unit (GPU), or one or more integrated circuits, and is configured to execute a related program, to implement the functions that need to be performed by the units in the apparatus for training a generative adversarial network in this embodiment of this application, or perform the method for training a generative adversarial network in the method embodiments of this application.

The processor 802 may alternatively be an integrated circuit chip and has a signal processing capability. In an implementation process, the steps of the method for training a generative adversarial network in this application may be completed by using an integrated logic circuit in a form of hardware or an instruction in a form of software in the processor 802. The processor 802 may alternatively be a general-purpose processor, a digital signal processor (DSP), an application-specific integrated circuit (ASIC), a field programmable gate array (FPGA) or another programmable logical device, a discrete gate or transistor logic device, or a discrete hardware component. The processor 802 may implement or perform the methods, the steps, and logical block diagrams that are disclosed in the embodiments of this application. The general-purpose processor may be a microprocessor, or the processor may be any conventional processor or the like. The steps of the methods disclosed with reference to the embodiments of this application may be directly performed and accomplished by using a hardware decoding processor, or may be performed and accomplished by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 801. The processor 802 reads information in the memory 801, and completes, in combination with hardware of the processor 802, the functions that need to be performed by the units included in the apparatus for training a generative adversarial network in the embodiments of this application, or performs the method for training a generative adversarial network in the method embodiments of this application.

The communications interface 803 uses a transceiver apparatus, for example, but not limited to, a transceiver, to implement communication between the apparatus 800 and another device or another communications network. For example, training data (for example, the face image and the face rotation image in Embodiment 1 of this application) may be obtained by using the communications interface 803.

The bus 804 may include a path for transmitting information between the components (for example, the memory 801, the processor 802, and the communications interface 803) of the apparatus 800.

It should be understood that receiving unit 601 in the apparatus 600 for training a generative adversarial network is equivalent to the communications interface 803 in the apparatus 800 for training a generative adversarial network, and the pose encoding unit 602, the face generation unit 604, the first discrimination unit 605, the second discrimination unit 606, and the back propagation unit 607 may be equivalent to the processor 802.

Figure 9:
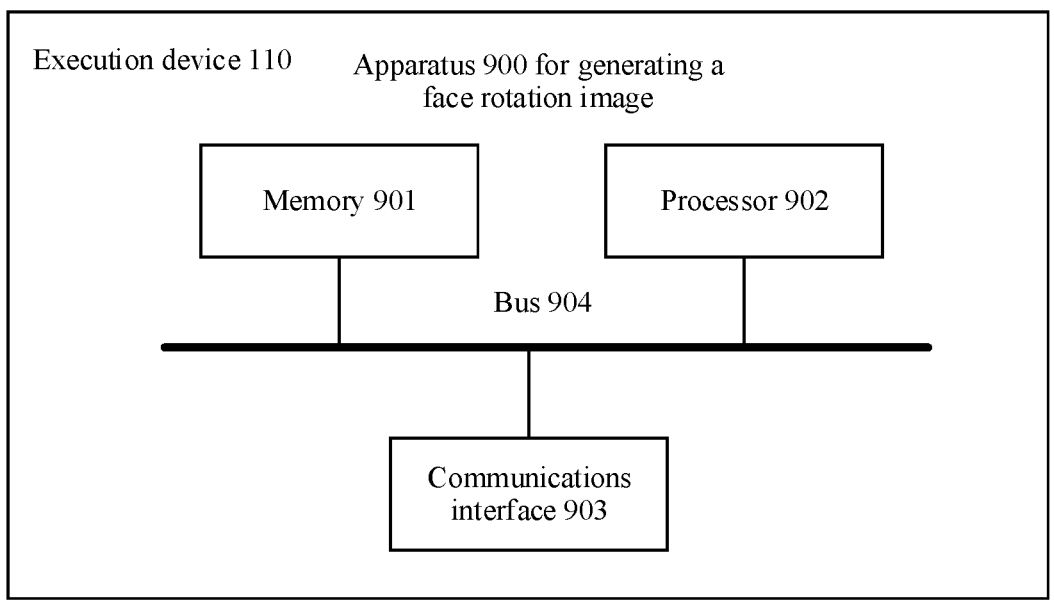
FIG. 9 is a schematic diagram of a hardware structure of an apparatus for generating a face rotation image according to an embodiment of this application.

FIG. 9 is a schematic diagram of a hardware structure of an apparatus 900 for generating a face rotation image according to an embodiment of this application. The apparatus 900 (the apparatus 900 may be specifically a computer device) for generating a face rotation image shown in FIG. 9 includes a memory 901, a processor 902, a communications interface 903, and a bus 904. A communication connection between the memory 901, the processor 902, and the communications interface 903 is implemented by using the bus 904.

The memory 901 may be a read-only memory (ROM), a static storage device, a dynamic storage device, or a random access memory (RAM). The memory 901 may store a program. When the program stored in the memory 901 is executed by the processor 902, the processor 902 and communications interface 903 are configured to perform the steps of the method for generating a face rotation image in the embodiments of this application.

The processor 902 may be a general-purpose central processing unit (CPU), a microprocessor, an application-specific integrated circuit (ASIC), a graphics processing unit (GPU), or one or more integrated circuits, and is configured to execute a related program, to implement the functions that need to be performed by the units in the apparatus for generating a face rotation image in this embodiment of this application, or perform the method for generating a face rotation image in the method embodiments of this application.

The processor 902 may alternatively be an integrated circuit chip and has a signal processing capability. In an implementation process, the steps of the method for generating a face rotation image in this application may be completed by using an integrated logic circuit in a form of hardware or an instruction in a form of software in the processor 902. The processor 902 may alternatively be a general-purpose processor, a digital signal processor (DSP), an application-specific integrated circuit (ASIC), a field programmable gate array (FPGA) or another programmable logical device, a discrete gate or transistor logic device, or a discrete hardware component. The processor 902 may implement or perform the methods, the steps, and logical block diagrams that are disclosed in the embodiments of this application. The general-purpose processor may be a microprocessor, or the processor may be any conventional processor or the like. The steps of the methods disclosed with reference to the embodiments of this application may be directly performed and accomplished by using a hardware decoding processor, or may be performed and accomplished by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 901. The processor 902 reads information in the memory 901, and completes, in combination with hardware of the processor 902, the functions that need to be performed by the units included in the apparatus for generating a face rotation image in this embodiment of this application, or performs the method for generating a face rotation image in the method embodiments of this application.

The communications interface 903 uses a transceiver apparatus, for example, but not limited to, a transceiver, to implement communication between the apparatus 900 and another device or another communications network. For example, training data (for example, the face image in Embodiment 2 of this application) may be obtained by using the communications interface 903.

The bus 904 may include a path for transmitting information between the components (for example, the memory 901, the processor 902, and the communications interface 903) of the apparatus 900.

It should be understood that receiving unit 701 and the obtaining unit 703 in the apparatus 700 for generating a face rotation image are equivalent to the communications interface 903 in the apparatus 900 for generating a face rotation image. The pose encoding unit 702, the signal generation unit 704, and the image generation unit 705 in the apparatus 700 for generating a face rotation image may be equivalent to the processor 902.

It should be noted that although only the memory, the processor, and the communications interface of each of the apparatuses 800 and 900 shown in FIG. 8 and FIG. 9 are illustrated, in a specific implementation process, a person skilled in the art should understand that the apparatuses 800 and 900 each further include other components necessary for implementing normal operation. In addition, based on a specific requirement, a person skilled in the art should understand that the apparatuses 800 and 900 may further include hardware components for implementing other additional functions. In addition, a person skilled in the art should understand that the apparatuses 800 and 900 each may include only components necessary for implementing the embodiments of this application, but not necessarily include all the components shown in FIG. 8 or FIG. 9.

It may be understood that the apparatus 800 is equivalent to the training device 120 in FIG. 1, and the apparatus 900 is equivalent to the execution device 110 in FIG. 1. A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementations. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for generating a face rotation image, applied to a computer device, the method comprising:
   receiving a face image;
   performing pose encoding on the face image based on two or more landmarks in the face image, to obtain pose encoded images of the face image;
   obtaining a plurality of first training images from a training data set based on a face rotation angle, wherein each of the plurality of first training images comprises a face, and a presented rotation angle of the face comprised in each of the plurality of first training images is the face rotation angle;
   performing pose encoding on a target face image based on two or more landmarks in the target face image, to obtain pose encoded images of the target face image, wherein the target face image is obtained based on the plurality of first training images;
   generating a to-be-input signal based on the face image, the pose encoded images of the face image, and the pose encoded images of the target face image, wherein a size of the face image, a size of the pose encoded images of the face image, and a size of the pose encoded images of the target face image are the same; and
   inputting the to-be-input signal into a face rotation image generative model, to obtain a face rotation image.

2. The method according to claim 1, wherein performing the pose encoding on the face image based on the two or more landmarks in the face image comprises:
   detecting the face image by using a landmark detection algorithm, to obtain location coordinates respectively associated with N landmarks of the face image, wherein N is an integer greater than 1;
   constructing N first images having a same size as the face image, wherein the N first images are in a one-to-one correspondence with the N landmarks; and
   performing, by using each of the N landmarks as a center, Gaussian blurring on the first image that is in the one-to-one correspondence with the landmark, to obtain N first Gaussian blurred images, wherein the N first Gaussian blurred images are the pose encoded images of the face image.

3. The method according to claim 1, wherein performing the pose encoding on the target face image based on the two or more landmarks in the target face image further comprises:
   detecting the target face image by using the landmark detection algorithm, to obtain location coordinates respectively associated with M landmarks of the target face image, wherein M is an integer greater than 1;
   constructing M second images having a same size as the target face image, wherein the M second images are in a one-to-one correspondence with the M landmarks; and
   performing, by using each of the M landmarks as a center, Gaussian blurring on the second image that is in the one-to-one correspondence with the landmark, to obtain M second Gaussian blurred images, wherein the M second Gaussian blurred images are the pose encoded images of the target face image.

4. The method according to claim 1, wherein the target face image is obtained based on an average value of pose encoded images of the plurality of first training images.

5. The method according to claim 1, wherein the face rotation image generative model is obtained based on training of a generative adversarial network; the generative adversarial network comprises at least one face generator network and at least two discriminator networks; the at least two discriminator networks are coupled and adversarial, to generate an adversarial loss; the adversarial loss is used to update the at least one face generator network and the at least two discriminator networks; and the at least one updated face generator network is the face rotation image generative model.

6. A non-transitory computer-readable storage medium, wherein the computer-readable storage medium stores a program instruction, which when executed by a processor, causes the processor to implement the method according to claim 1.

7. A method for training a generative adversarial network, applied to a computer device, wherein the generative adversarial network comprises a face generator network and a plurality of coupled adversarial discriminator networks, the coupled adversarial discriminator networks comprise at least a first discriminator network and a second discriminator network, and the method comprises:
receiving a face image and a face rotation image, wherein the face image and the face rotation image are images before and after a same face is rotated;
performing pose encoding on the face image based on two or more landmarks in the face image, to obtain pose encoded images of the face image;
performing pose encoding on the face rotation image based on two or more landmarks in the face rotation image, to obtain pose encoded images of the face rotation image;
inputting the face image, the pose encoded images of the face image, and the pose encoded images of the face rotation image into the face generator network, to generate a predicted face rotation image;
inputting the face image, the face rotation image, and the predicted face rotation image into the first discriminator network, to obtain a first loss;
inputting the face rotation image, the pose encoded images of the face rotation image, and the predicted face rotation image into the second discriminator network, to obtain a second loss;
updating the face generator network, the first discriminator network, and the second discriminator network based on a total loss of the generative adversarial network, wherein the total loss of the generative adversarial network is obtained based on a weighted sum of the first loss and the second loss; and
outputting the trained face generator network after the total loss of the generative adversarial network is converged.

8. The method according to claim 7, wherein before the updating the face generator network, the first discriminator network, and the second discriminator network based on the total loss of the generative adversarial network, the method further comprises:
obtaining an authentic image loss based on the face rotation image and the predicted face rotation image, wherein the authentic image loss comprises at least one of a pixel loss, a total variation regularization, or an identity recognition feature loss; and wherein the total loss of the generative adversarial network is obtained based on a weighted sum of the at least one loss in the authentic image loss, the first loss, and the second loss.

9. The method according to claim 8, wherein in response to the authentic image loss comprising the pixel loss, obtaining the authentic image loss based on the face rotation image and the predicted face rotation image comprises:

$$L_{pix} = \frac{1}{S}\sum_{s=1}^{S} \left\| \hat{I}^b - I^b \right\|_1^s,$$

wherein
$L_{pix}$ is the pixel loss, S is a scale metric, $\hat{I}^b$ is the predicted face rotation image, $I^b$ is the face rotation image, and $\|\hat{I}^b - I^b\|_1^s$ represents that a 1-norm loss of a pixel difference is calculated when the predicted face rotation image and the face rotation image are scaled to the S scale metric.

10. The method according to claim 8, wherein in response to the authentic image loss comprising the total variation regularization, obtaining the authentic image loss based on the face rotation image and the predicted face rotation image comprises:

$$L_{tv} = \sum_{c=1}^{C} \sum_{w,h=1}^{W,H} \left| \hat{I}^b_{w+1,h,c} - \hat{I}^b_{w,h,c} \right| + \left| \hat{I}^b_{w+1,h,c} - \hat{I}^b_{w,h,c} \right|,$$

wherein
$L_{tv}$ is the total variation regularization, to be specific, a sum of first-order gradient absolute values of the predicted face rotation image $\hat{I}^b$ in both horizontal and vertical directions, wherein W represents a width of the predicted face rotation image, H represents a height of the predicted face rotation image, and C represents a quantity of channels of the predicted face rotation image.

11. The method according to claim 8, wherein in response to the authentic image loss comprising the identity recognition feature loss, obtaining the authentic image loss based on the face rotation image and the predicted face rotation image comprises:

$$L_{ip} = \|D_f^p(\hat{I}^b) - D_f^p(I^b)\|_2 + \|D_f^{fc}(\hat{I}^b) - D_f^{fc}(I^b)\|, \text{ where}$$

$L_{ip}$ indicates the identity recognition feature loss, wherein an identity recognition feature is used to ensure that identity information remains unchanged for the predicted face rotation image and the face image; and f is a pre-trained facial recognition model, the facial recognition model f is a deep neural network, and the deep neural network comprises at least one pooling layer and at least one fully connected layer, wherein $D_f^p(\cdot)$ represents an output of the last pooling layer of the facial recognition model f, and $D_f^{fc}(\cdot)$ represents an output of the last fully connected layer of the facial recognition model f.

12. The method according to claim 7, wherein performing the pose encoding on the face image based on the two or more landmarks in the face image further comprises:
detecting the face image by using a landmark detection algorithm, to obtain location coordinates respectively associated with N landmarks of the face image; constructing N first images having a same size as the face image, wherein the N first images are in a one-to-one correspondence with the N landmarks; and performing, by using each of the N landmarks as a center, Gaussian blurring on the first image that is in the one-to-one correspondence with the landmark, to obtain N first Gaussian blurred images, wherein the N first Gaussian blurred images are the pose encoded images of the face image, and N is a positive integer greater than 1.

13. The method according to claim 7, wherein performing the pose encoding on the face rotation image based on the two or more landmarks in the face rotation image further comprises:
detecting the face rotation image by using the landmark detection algorithm, to obtain location coordinates respectively associated with M landmarks of the face rotation image; constructing M second images having a same size as the face rotation image, wherein the M second images are in a one-to-one correspondence with the M landmarks; and performing, by using each of the M landmarks as a center, Gaussian blurring on the second image that is in the one-to-one correspondence with the landmark, to obtain M second Gaussian blurred images, wherein the M second Gaussian blurred images are the pose encoded images of the face rotation image, and M is a positive integer greater than 1.

14. The method according to claim 7, wherein inputting the face image, the face rotation image, and the predicted face rotation image into the first discriminator network, to obtain the first loss further comprises:
determining truth or falsehood of the face rotation image and the predicted face rotation image based on the first discriminator network by using the face image as a discrimination condition of the first discriminator network; and generating the first loss based on a discrimination result, wherein the first discriminator network comprises a binary classification discriminator, and the binary classification discriminator is configured to determine the truth or falsehood.

15. The method according to claim 14, wherein determining the truth or falsehood of the face rotation image and the predicted face rotation image and generating the first loss further comprises:

$$L^{ii}=E_{I^b \sim H(I^b)}[\log D_{\theta_{ii}}(I^b,I^a)]+E_{I^b \sim H(\hat{I}^b)}[1-D_{\theta_{ii}}(\hat{I}^b,I^a)],$$
where $L^{ii}$ is the first loss; $I^a$ is the face image; $I^b$ is the face rotation image; $\hat{I}^b$ is the predicted face rotation image; $E_{I^b \sim H(I^b)}$ represents an expectation of distribution $H(I^b)$ of the face rotation image $I^b$, namely, a probability that the face rotation image $I^b$ is true; $\log D_{\theta_{ii}}(I^b, I^a)$ represents a loss function of the first discriminator network; $E_{I^b \sim H(\hat{I}^b)}$ represents an expectation of distribution $H(\hat{I}^b)$ of the predicted face rotation image $\hat{I}^b$, namely, a probability that the predicted face rotation image $\hat{I}^b$ is true; $D_{\theta_{ii}}(\hat{I}^b, I^a)$ is the first discriminator network using the face image as a condition; $\theta_{ii}$ is a parameter of the first discriminator network; and $(\hat{I}^b, I^a)$ is an input of the first discriminator network.

16. The method according to claim 7, wherein inputting the face rotation image, the pose encoded images of the face rotation image, and the predicted face rotation image into the second discriminator network further comprises:
determining truth or falsehood of the face rotation image and the predicted face rotation image based on the second discriminator network by using the pose encoded images of the face rotation image as a discrimination condition of the second discriminator network; and generating the second loss based on a discrimination result, wherein the second discriminator network comprises a binary classification discriminator, and the binary classification discriminator is configured to determine the truth or falsehood.

17. The method according to claim 16, wherein determining the truth or falsehood of the face rotation image and the predicted face rotation image and generating the second loss further comprise:

$$L^{ip}=E_{I^b \sim H(I^b)}[\log D_{\theta_{ip}}(I^b,P^b)]+E_{I^b \sim H(\hat{I}^b)}[1-D_{\theta_{ip}}(\hat{I}^b,P^b)],$$
where $L^{ip}$ is the second loss; $I^b$ is the face rotation image; $\hat{I}^b$ is the predicted face rotation image; $P^b$ is the pose encoded images of the face rotation image; $E_{I^b \sim H(I^b)}$ represents an expectation of distribution $H(I^b)$ of the face rotation image $I^b$, namely, a probability that the face rotation image $I^b$ is true; $[\log D_{\theta_{ip}}(I^b, P^b)$ represents a loss function of the second discriminator network; $E_{I^b \sim H(\hat{I}^b)}$ represents an expectation of distribution $H(\hat{I}^b)$ of the predicted face rotation image $\hat{I}^b$, namely, a probability that the predicted face rotation image $\hat{I}^b$ is true; $D_{\theta_{ip}}(\hat{I}^b, P^b)$ is the second discriminator network using the pose encoded images of the face rotation image as a condition; $\theta_{ip}$ is a parameter of the second discriminator network; and $(\hat{I}^b, P^b)$ is an input of the second discriminator network.

18. A device for training a generative adversarial network, comprising a processor and a memory, wherein the memory is configured to store a program instruction, and the processor is configured to invoke the program instruction to perform the method according to claim 7.

19. A non-transitory computer-readable storage medium, wherein the computer-readable storage medium stores a program instruction, which when executed by a processor, causes the processor to implement the method according to claim 7.

20. A device for generating a face rotation image, comprising a processor and a memory, wherein the memory is configured to store a program instruction, and the processor is configured to execute the program instruction to perform a method for generating a face rotation image, the method comprising:
receiving a face image;
performing pose encoding on the face image based on two or more landmarks in the face image, to obtain pose encoded images of the face image;
obtaining a plurality of first training images from a training data set based on a face rotation angle, wherein each of the plurality of first training images comprises a face, and a presented rotation angle of the face comprised in each of the plurality of first training images is the face rotation angle;
performing pose encoding on a target face image based on two or more landmarks in the target face image, to obtain pose encoded images of the target face image, wherein the target face image is obtained based on the plurality of first training images;
generating a to-be-input signal based on the face image, the pose encoded images of the face image, and the pose encoded images of the target face image, wherein a size of the face image, a size of the pose encoded images of the face image, and a size of the pose encoded images of the target face image are the same; and
inputting the to-be-input signal into a face rotation image generative model, to obtain a face rotation image.

* * * * *

UNITED STATES PATENT AND TRADEMARK OFFICE
CERTIFICATE OF CORRECTION

PATENT NO. : 11,232,286 B2
APPLICATION NO. : 17/038208
DATED : January 25, 2022
INVENTOR(S) : Rao et al.

It is certified that error appears in the above-identified patent and that said Letters Patent is hereby corrected as shown below:

In the Claims

Claim 2: Column 44, Line 26: "more landmarks in the face image comprises:" should read -- more landmarks in the face image further comprises: --.

Claim 8: Column 45, Line 45: "The method according to claim 7, wherein before the" should read -- The method according to claim 7, wherein before --.

Claim 11: Column 46, Line 34: ", where" should read -- , wherein --.

Claim 15: Column 47, Line 32: "where" should read -- wherein --.

Claim 17: Column 48, Line 2: "where" should read -- wherein --.

Signed and Sealed this
Fifth Day of July, 2022

Katherine Kelly Vidal
*Director of the United States Patent and Trademark Office*